US011999504B2

(12) United States Patent
Bekanich

(10) Patent No.: US 11,999,504 B2
(45) Date of Patent: *Jun. 4, 2024

(54) SMART AVIONICS SYSTEM

(71) Applicant: Joseph Bekanich, Kingston, PA (US)

(72) Inventor: Joseph Bekanich, Kingston, PA (US)

(73) Assignee: InFlight Labs, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,299

(22) Filed: Mar. 6, 2015

(65) Prior Publication Data
US 2016/0176538 A1    Jun. 23, 2016

Related U.S. Application Data

(63) Continuation-in-part of application No. 13/022,889, filed on Feb. 8, 2011, now abandoned.

(51) Int. Cl.
| | |
|---|---|
| *B64D 45/00* | (2006.01) |
| *G07C 5/00* | (2006.01) |
| *G07C 5/08* | (2006.01) |
| *G08G 5/00* | (2006.01) |
| *H04B 7/185* | (2006.01) |
| *H04L 12/18* | (2006.01) |

(52) U.S. Cl.
CPC ............ *B64D 45/00* (2013.01); *G07C 5/008* (2013.01); *G07C 5/085* (2013.01); *G08G 5/0021* (2013.01); *H04B 7/18506* (2013.01); *H04L 12/1895* (2013.01); *B64D 2045/0065* (2013.01); *H04M 2242/04* (2013.01); *H04M 2242/15* (2013.01); *H04M 2242/30* (2013.01)

(58) Field of Classification Search
CPC ...... G07C 5/008; G07C 5/085; G08G 5/0021; B64D 45/00; B64D 2045/0065; H04B 7/18506; H04L 12/1895; H04M 2242/04; H04M 2242/15; H04M 2242/30
USPC ......................................................... 709/246
See application file for complete search history.

(56) References Cited

U.S. PATENT DOCUMENTS

| | | | | | |
|---|---|---|---|---|---|
| 5,351,194 | A | * | 9/1994 | Ross ..................... | B60R 25/102 342/357.31 |
| 5,367,306 | A | * | 11/1994 | Hollon .................... | G01S 19/17 342/357.31 |
| 6,092,008 | A | * | 7/2000 | Bateman ......................... | 701/14 |
| 6,275,164 | B1 | * | 8/2001 | MacConnell ......... | G01S 5/0027 340/573.1 |

(Continued)

FOREIGN PATENT DOCUMENTS

WO    WO 2010/134101 A1 * 11/2010 ............. B64C 15/14

*Primary Examiner* — James E Springer
(74) *Attorney, Agent, or Firm* — Joseph Stecewycz

(57) ABSTRACT

The invention is an aircraft communication network including: avionics monitoring software in communication with a flight data recorder and an aircraft emergency location transmitter; the avionics monitoring software functioning to acquire real-time aircraft operating parameters by monitoring an ADS-B system and a power management module to communicate with an activation module that activates an aircraft emergency location transmitter and initiates two-way communication with a satellite upon detection of an anomaly in the aircraft operating parameters, the aircraft emergency location transmitter transmitting aircraft location coordinates and an emergency signal.

17 Claims, 25 Drawing Sheets

(56) References Cited

U.S. PATENT DOCUMENTS

| | | | | |
|---|---|---|---|---|
| 6,341,248 | B1* | 1/2002 | Johnson | G05D 1/0833 |
| | | | | 244/1 R |
| 9,043,043 | B1* | 5/2015 | Gribble | G05D 1/00 |
| | | | | 701/1 |
| 9,327,841 | B1* | 5/2016 | Sipper | B64D 45/00 |
| 9,403,602 | B1* | 8/2016 | Heinrich | B64D 45/00 |
| 2003/0071743 | A1* | 4/2003 | Seah | B64C 1/1469 |
| | | | | 340/945 |
| 2003/0078029 | A1* | 4/2003 | Petite | H04M 11/04 |
| | | | | 455/404.1 |
| 2003/0135311 | A1* | 7/2003 | Levine | 701/35 |
| 2003/0201365 | A1* | 10/2003 | Nelson | B64D 45/0015 |
| | | | | 244/118.5 |
| 2003/0225492 | A1* | 12/2003 | Cope et al. | 701/35 |
| 2005/0093707 | A1* | 5/2005 | Van Winkle | G08B 17/107 |
| | | | | 340/630 |
| 2005/0258958 | A1* | 11/2005 | Lai | G07C 9/00103 |
| | | | | 340/539.15 |
| 2007/0067074 | A1* | 3/2007 | Lykken et al. | 701/16 |
| 2009/0040108 | A1* | 2/2009 | Katz | G01S 5/0231 |
| | | | | 342/386 |
| 2011/0125348 | A1* | 5/2011 | Sandell | G07C 5/008 |
| | | | | 701/14 |
| 2011/0246001 | A1* | 10/2011 | Shavit | G08G 5/0026 |
| | | | | 701/14 |
| 2012/0232746 | A1* | 9/2012 | Wiederwohl | G07C 5/085 |
| | | | | 701/33.4 |
| 2014/0324255 | A1* | 10/2014 | Siddiqi | B64D 25/00 |
| | | | | 701/14 |
| 2014/0343765 | A1* | 11/2014 | Suiter | G08G 5/0056 |
| | | | | 701/18 |

* cited by examiner

126 { 
3/28/2014 1306 hrs. Ground Proximity Warning System Device Failure;
Cockpit Electronics / Symbol Generator Display Parameter Breached;
FDR Videolink: Deployed;
Emergency Broadcast Notification: Deployed to 42 Members

128 {
Flight Details: To: Tampa(TP) From: Denver(DV) Airline: SomeAir Aircraft: SAI1027
Altitude: 35,000 Bearing: 76° Speed: 425 mph / 369.3 Kts Remaining: 122 miles
Coordinates: 39.183334, -76.444997 Aircraft Type: E190

Sender Details: (verified)
Login for secured sender details

SMART AVIONICS SYSTEM

CROSS REFERENCE TO RELATED APPLICATIONS

The present Application is a Continuation-in-Part of patent application entitled "Multi-Format Message Communication," filed 8 Feb. 2010 and assigned filing Ser. No. 13/022,889, and is related to co-pending patent application entitled "Video-Enhanced Flight Data Recorder with Emergency Broadcast Notification," filed 29 Jul. 2014 and assigned filing Ser. No. 14/446,025, both patent applications incorporated herein by reference in their entireties.

FIELD OF THE INVENTION

The present invention relates to a system and method for enhanced communication with an aircraft and, more particularly, to real-time acquisition of aircraft status and flight parameters.

BACKGROUND OF THE INVENTION

FIG. 1 shows a generalized diagram of a communication system 10 based on a communications network 12. The communications network 12 may operate as a wireless network, a wireline network, or a combination of wired and wireline. In most applications, the communications network 12 includes the Internet, and may optionally include any networks adapted to communicate with the Internet. The communications network 12 may be configured as a local area network (LAN), a wide area network ('WAN'), a cellular network, or a combinations of LAN, WAN and cellular networks.

As shown in the illustration, the communications network 12 may be accessed by a plurality of various communication devices such as, for example, desktop computers 14, computer tablets 16, laptop computers 18, personal data assistants 22, and mobile communication devices 24. In particular, the flight crew of a commercial aircraft 30 may access the communications network 12 via an aircraft audio communication link 26 to communicate with ground-based personnel 20.

Today's aviation environment commands improved means of capturing, recording, and communicating real-time inflight emergencies and device functionality for the commercial aircraft 30, as shown in FIG. 2, through existing and next generation flight data recorders (FDRs) 32, or "black boxes." The flight data recorder 32 is typically mounted under the tail section of the commercial aircraft 30, and receives data from a flight data acquisition unit (FDAU) 34 via an FDAU communication link 36, which is typically a continuous time division multiplexed serial data bus, in accordance with Standard ARINC 717. Standard ARINC 717 defines the acquisition of flight data for recording purposes. The flight data acquisition unit 34 time division multiplexes the flight data, and routes the flight data to the flight data recorder 32 over the FDAU communication link 36. Flight data parameters are differentiated by their position (i.e., time slot address) in the respective data frame.

The ARINC 717 Standard provides design guidelines for the flight data recorder 32. The primary use for the flight data recorder 32 is in commercial aircraft. The function of the flight data recorder 32 is to provide the capability to meet FAA mandatory flight data recording requirements, along with other data acquisition needs. The flight data acquisition unit 34 samples, conditions, and digitizes or reformats the flight data. The flight data recorder 32 is basically a data recorder with a crash-protected storage medium.

The flight data recorder 32 functions to continually acquire specified flight data via a flight configuration data link 28 (represented by a dotted line). This flight data may include, for example, landing gear position 38, engine speed 42, wing flap position 44, aileron position 46, and rudder position 48. In some applications, a cockpit voice recorder 40 is used to store voice data of conversations conducted in the cockpit of the commercial aircraft 30. A standard cockpit voice recorder 40 has a recording capacity of about two hours for four channels of audio data. In some applications, the flight data recorder 32 and the cockpit voice recorder 40 are manufactured as a single unit.

In spite of advancements in the monitoring and recording of data, there has been little improvement in the methods and means to record events during or after an emergency or crash of the commercial aircraft 30. The National Transportation Safety Board (NTSB) and other related departments still rely primarily on the flight data recorder 32 to provide the history of flight-related events for a given flight or aircraft. This requires that the flight data recorder 32 first be retrieved before aircraft instrumentation and flight activity can be obtained and analyzed. Additionally, if an aircraft crashes, the NTSB or related parties have a window of approximately thirty days to recover the flight data recorder 32, or all recorded data related to the particular flight or commercial aircraft 30 may be permanently lost.

Unfortunately, few if any aircraft-monitoring methods provide real-time alerts and communication to aviation officials, or other ground personnel, during inflight incidents or potential emergencies, for example. Aircraft monitoring device alerts and communications are normally limited to that obtained from the flight data recorder 32 and similar on-board devices. Data related to these alerts and notifications remain in the devices and are not otherwise shared with aircraft personnel or authorities on the ground. Aircraft devices that are read by the flight data recorder 32, the cockpit voice recorder 40, the flight data acquisition unit 34, and a flight management control unit (not shown) are not configured to communicate with Air Traffic Control (ATC) or Federal Aviation Association members on a real-time basis such as, for example, during a crisis situation.

FIG. 3 depicts a functional block diagram of a conventional configuration of an aircraft avionics monitoring system 50. In the example shown, the avionics monitoring system 50 functions to provide communication between the flight data recorder 32, a central maintenance computer (CMC) 52, and the flight data acquisition unit 34. An integrated avionics subsystem 60 includes the flight data acquisition unit 34, a flight data entry panel (FDEP) 54, and a quick access recorder (QAR) 56. The quick access recorder 56 samples flight data at a higher rate than the flight data recorder 32, and provides access to raw flight data via an electrical cable connection.

The integrated avionics subsystem 60 can provide flight status to the flight data recorder 32 and to a portable maintenance access terminal (PMAT) 58. The portable maintenance access terminal 58 is a flight line maintenance support tool that can be used to load software into the integrated avionics subsystem 60, and thus provides configuration control for avionics software deployed within a fleet of commercial aircraft. The portable maintenance access terminal 58 can also interface with a portable quick access recorder 62 and a flight operations quality assurance (FOQA) system 64 with access to a data table 66. FOQA is a method of capturing, analyzing and/or visualizing the data generated by an aircraft moving through the air from one point to another.

The flight data acquisition unit 34 receives various discrete, analog and digital parameters from a number of sensors and avionics systems in the commercial aircraft 30. The flight data acquisition unit 34 routes the received data to the flight data recorder 32 and, if installed, also to the quick access recorder 56. Information from the flight data acquisition unit 34 is sent to the flight data recorder 32 via specific data frames, which depend on the aircraft manufacturer. The flight data acquisition unit 34 is often used to output a second, non-mandated data steam to be used by the flight operations quality assurance system 64.

The flight operations quality assurance system 64 functions to capture, analyze, and/or visualize the data generated by a commercial aircraft moving through the air from one location to another. Applying the information learned from this analysis helps to find new ways to improve flight safety and increase overall operational efficiency. Several airlines and air forces have initiated FOQA programs to collect, store and analyze recorded flight data. The goal is to improve the organization or unit's overall safety, increase maintenance effectiveness and reduce operational costs.

It can be appreciated that, when an incident has occurred and becomes known to officials, flight safety authorities are dependent on information received from the individual pilot and or the relevant air traffic controller to communicate the incident information to authorities. This method often incurs human error and allows personal decision making to enter into the communication cycle, a shortcoming which has proven to be problematic.

The aforementioned limitations have been evident in recent airline crashes as well as aircraft disappearances, and has created broken information streams and situational awareness for authorities. What is needed is a system and method for effectively handling, storing, and communicating of real-time aircraft data to responsible authorities.

BRIEF SUMMARY OF THE INVENTION

In one aspect of the present invention, an aircraft communication network suitable for providing two-way communication between an aircraft in flight and ground-based facilities comprises: avionics monitoring software in communication with aircraft avionics, the aircraft avionics including a flight data recorder and an emergency location transmitter; the avionics monitoring software functioning to acquire real-time aircraft operating parameters from the flight data recorder; the avionics monitoring software further functioning to activate the emergency location transmitter upon detection of an anomaly in the aircraft operating parameters, and a processor/compiler in communication with the avionics monitoring software; a transmitter in communication with the processor/compiler, the processor/compiler functioning to transmit real-time data obtained from the aircraft flight data recorder to the transmitter for transmission to the ground-based facilities using aircraft communication methodology.

The additional features and advantage of the disclosed invention is set forth in the detailed description which follows, and will be apparent to those skilled in the art from the description or recognized by practicing the invention as described, together with the claims and appended drawings.

The disclosed invention provides for real-time; aircraft-wide, voice, audio, video and data recording, transmitting and broadcasting systems that can be coupled with, for example, (i) conventional flight data recorders, (ii) cockpit voice recorders, or (iii) similar equipment, with added instrumentation, equipment or modification. Alternatively, the innovation disclosed herein may be incorporated into: (i) a newly designed flight data recorder, (ii) similar equipment deployment or configuration, or (iii) a system including a flight voice/video/data recorder and communicator (FVVDRC) features and functions.

The FVVDRC real-time record and information distribution functions may be activated by a software application and/or hardware system that has set flight data recorder or any flight instrumentation parameters applied. The activation may be initiated manually when such parameters are breached, or automatically and remotely, through a remote control unit: (i) by a software application interface, (ii) though a headset, (iii) by voice commands or voice recognition software, (iv) through a ground or aircraft sensor, (v) by aircraft personnel on or off the aircraft, or (vi) through flight data information, such as but not limited to any function of the flight data recorder, cockpit voice recorder or similar equipment. The occurrence of a parameter breach is recorded, transmitted and broadcast over available communication methodologies to least one authority or government official and or information processing and response based equipment, personnel or rescue drone during or after an occurrence of the parameter breach.

The disclosed method may incorporate a specially-designed FVVDRC utilizing a GPS and time-stamped based voice, audio, video, data, instrument and or sensor information recording and distribution which may synchronize information with (i) the existing FDR, and or concurrently on or to (ii) independent devices and recording and distribution equipment both on and off the aircraft; or (iii) may be integrated into other aircraft equipment.

In an illustrative embodiment, the FVVDRC may also record and distribute information on, from or through; integrated aircraft equipment; and concurrently onto; a ground-based FVVDRC; a handheld or independent device; and or a computer server; cloud server, recorder or similar equipment both on and off the aircraft and may transmit or broadcast one or two way voice, audio, video, data, instrument and or sensor information, to authorized personnel which may bi-directionally and remotely control or interact with or between any device(s), instrumentation on the aircraft; on the ground or in another aircraft.

In the illustrative embodiment, the FVVDRC real-time record and information distribution functions may be activated and controlled: manually, automatically, remotely, through a remote control unit, by a software interface, though a headset, by voice commands or voice recognition software, through a ground or aircraft sensor, by aircraft personnel on or off the aircraft, through flight data information, such as but not limited to any function of the devices, instrumentation personnel or aircraft.

The disclosed innovation may be applied to, without limitation, any aircraft purpose or function of: (i) a Flight Data Acquisition Unit, (ii) flight management control, (iii) digital flight data recorders (DFDR), (iv) solid-state flight data recorders (SSFDR) and universal flight data recorders (UFDRs); (v) flight or ground proximity equipment, (vi) other flight data recorders; (vii) cockpit voice recorder, including voice, audio, video and/or data; (viii) emergency location transmitter (ELT); and (ix) through or by any aircraft equipment, instrumentation, detector, sensor or alarm, which may automatically broadcast, record and or concurrently transmit all flight voice/video/data recorder information pertinent to activation.

The disclosed methodology functions through one or more of the following: (i) networks, frequencies or equipment on the aircraft; (ii) a ground-based computer server; or (iii) on another aircraft's equipment or airline, or (iv) by government personnel. Applications include, without limitation: flight data acquisition unit/system, quick access recorder (QAR), flight data recorder, cockpit voice recorder, computer server, 3G, 4G, Wi-Fi or like communications; electrical control unit (ECU), VHF Radio, microwave transmission, electronic flight bag, digital/magnetic recorder, phone Smartphone, iPad, iPhone, PC tablet, datalink, satellite communication, video camera, surveillance system, aircraft communication addressing and reporting system (ACARS), automatic dependent surveillance addressed (ADS-A), automatic dependent surveillance broadcast (ADS-B), automatic dependent surveillance contract (ADS-C), air traffic management, universal access transceiver (UTC), traffic information services broadcast (TIS-B), civil aircraft, military aircraft, jet aircraft, unmanned aircraft or like methodologies that concurrently send, record, transmit or broadcast to at least one; person, authority, government Official; a ground-based flight voice/video/data recorder and communicator (FVVDRC), computer, recorder, information processing and or response based equipment, or rescue drone during or after an occurrence.

All of the aforementioned information may contain aircraft, GPS and time-stamped values and may be sent via a message or communication methodology if available; or stored until message or communication methodology is available; or at any time to; a ground-based FVVDRC, and at least one authority or government official and or information processing and response based equipment, personnel or rescue drone during or after an occurrence.

The disclosed methods may be applied to particular markets or to a particular technical limitation which may work independently or as a complete solution. The aforementioned methodologies are not limited to routine or emergency aircraft use, and maybe modified to work with any vehicle type, building or location, which is not limited to automobiles, boats, buses, trains, trucks, subways; mass transit vehicles, maritime vessel, private aircraft, commercial aircraft, air traffic control towers, airports, nuclear facilities, refineries, drilling platforms, waterways, airspace, structure, or location without deviating from the scope or spirit of this invention.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which:

FIG. 9 is a display generated by the FDR enhancement module automatic warning unit of FIG. 5 and transmitted to certain ground-based aviation officials as in FIG. 6;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

The present invention relates generally to a real-time; aircraft-wide, voice, audio, video and data recording, transmitting and broadcasting system that function with existing flight data recorders, cockpit voice recorders, and similar equipment.

Figure 1:
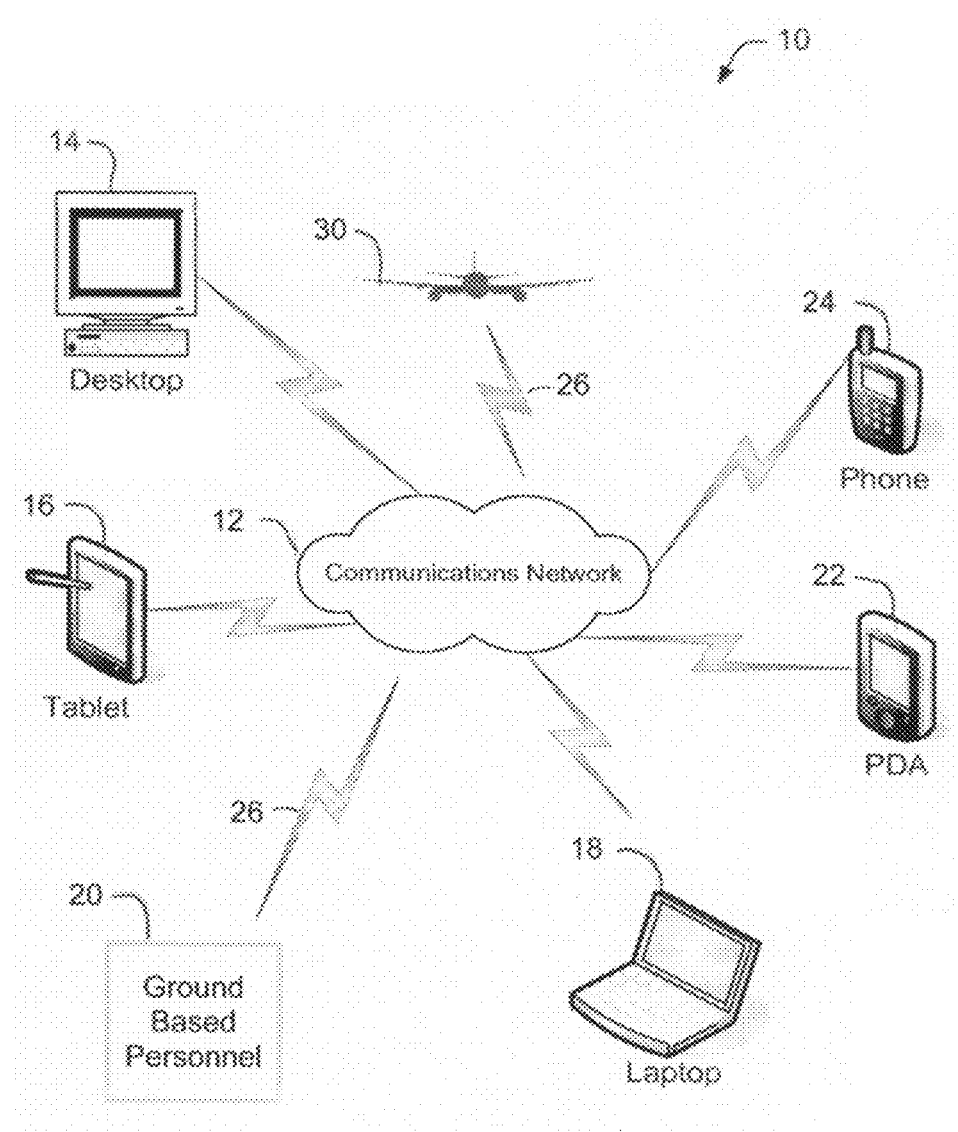
FIG. 1 is a diagrammatical illustration of a communication system showing a commercial aircraft accessing a communications network, in accordance with the present state of the art.
Figure 2:
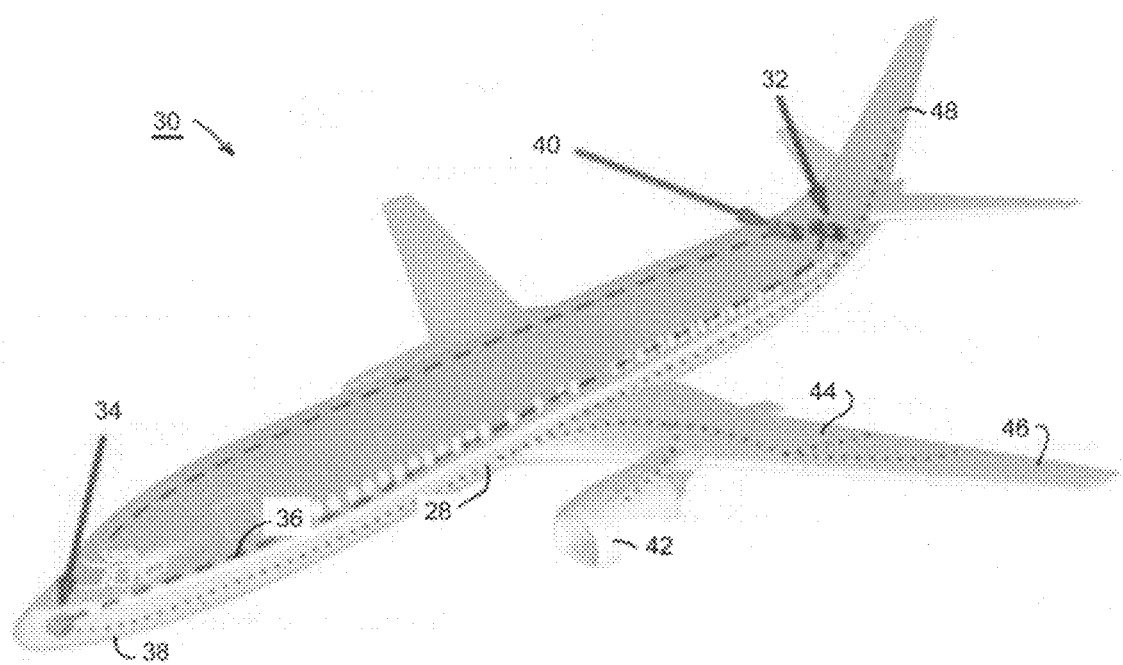
FIG. 2 is a diagram showing typical locations of the flight data acquisition unit, the cockpit voice recorder, and the flight data recorder, in accordance with the present state of the art.
Figure 3:
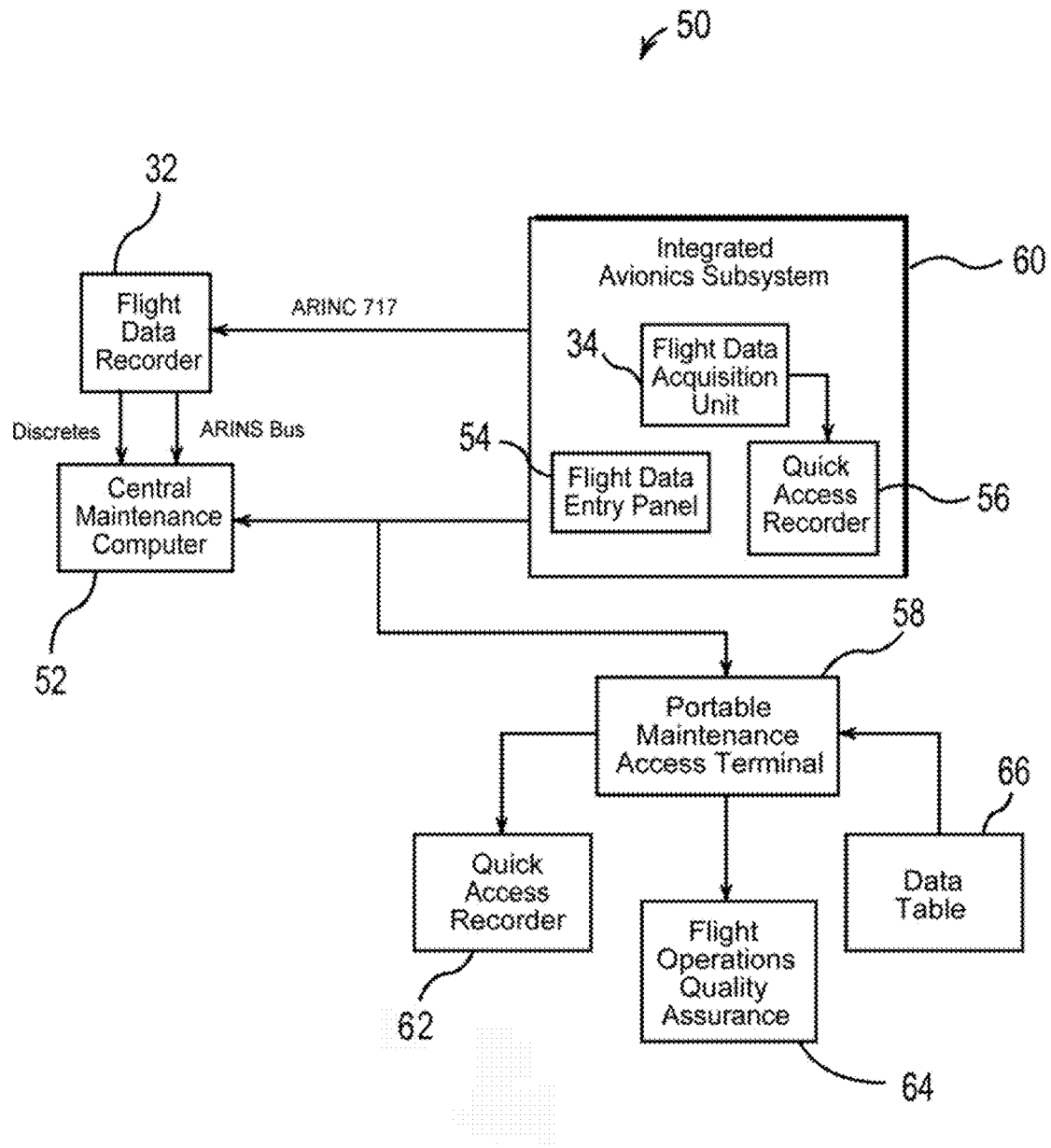
FIG. 3 is a functional block diagram of a conventional aircraft avionics system, in accordance with the present state of the art.
Figure 4:
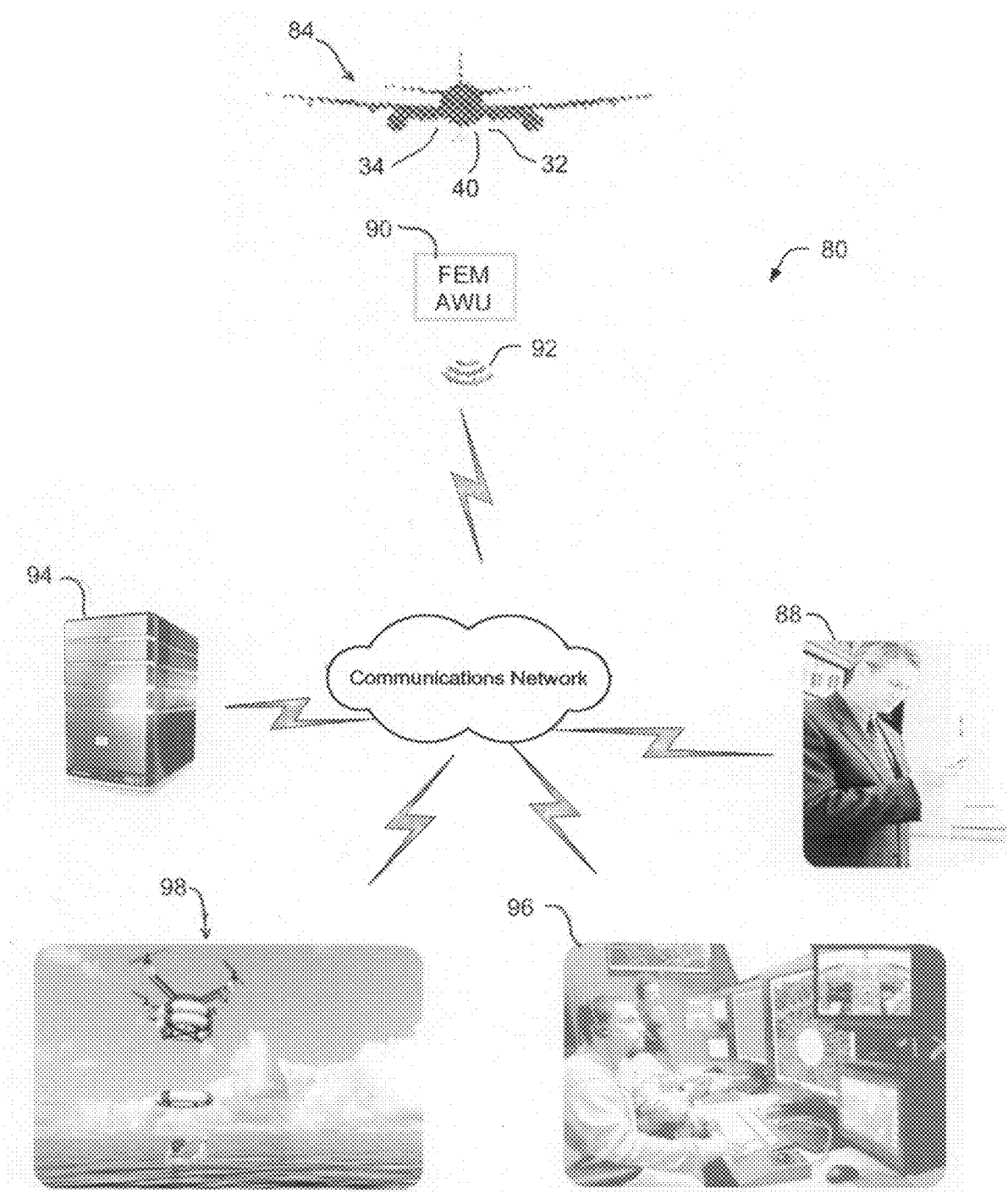
FIG. 4 is a diagram showing an aircraft with a B3L3 Unit enabling enhanced communication with a server/recorder and ground-based personnel, in accordance with an aspect of the present invention.

FIG. 4 illustrates an aircraft communication network 80 functioning to provide automatic notification signals 92, from a commercial aircraft 84 that has been equipped with an innovative FDR enhancement module automatic warning unit (FEM-AWU) 90, in accordance with an aspect of the present invention. The automatic notification signals 82 may include video, data, and voice communication transmitted via a communications network 86 that includes: (i) wired and wireless communication via the Internet, and (ii) wireless communication via terrestrial and satellite-based transmission in the electromagnetic spectrum. The FEM-AWU 90 functions to parse the automatic notification signals 92 using one or more of simple object access protocol (SOAP), communication, short message service (SMS) gateway communication, and a short message peer to peer (SMPP) protocol, as described in greater detail below.

Any or all of the video, data, and voice communication may thus be transmitted to one or more of a plurality of ground-based aviation entities such as, for example, air traffic control personnel 96 and responsible government officials 88, while the aircraft 84 is airborne. Data from the FDR 32, the FDAU 34, and the cockpit voice recorder (CVR) 40 may be stored in real time in a ground based server/recorder 94, for retrieval by an appropriate authority. It can be appreciated by one skilled in the art that the aircraft communication network 80 provides for essentially contemporaneously retrieving, reviewing, and analyzing flight parameters for the aircraft 84 without the ground-based aviation receiving entities necessarily having physical access to the flight data recorder or the flight data acquisition unit.

By virtue of the innovative features disclosed herein, the aircraft 84 may have the additional capability of automatically transmitting, for example, real-time images of selected interior views of the aircraft 84 to the air traffic control personnel 96. Ongoing flight and operational data for the aircraft 84 may be automatically obtained from the flight data recorder and the flight data acquisition unit, and continually downloaded to the server/recorder 94. Important text messages may be delivered to the government officials 88, or to other responsible airline industry personnel. If a problematic condition is detected in the aircraft 84, the aircraft location coordinates and an emergency signal may be automatically transmitted by an emergency location transmitter (ELT) 110 to deploy an emergency drone 98.

Figure 5:
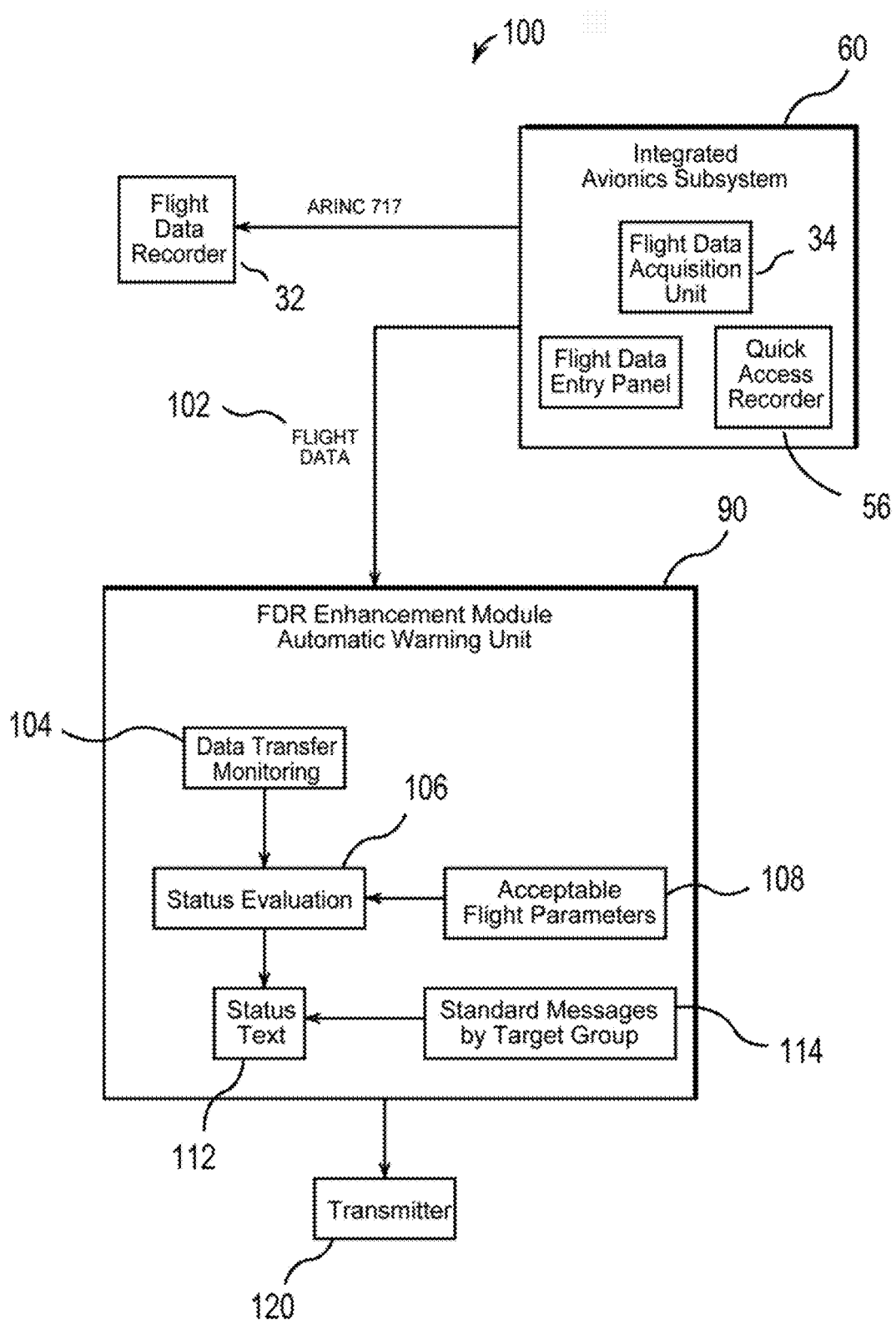
FIG. 5 is an operating diagram of an FDR enhancement module automatic warning unit for use with a conventional aircraft avionics system, in accordance with an aspect of the present invention.

There is shown in FIG. 5 an operating diagram of an enhanced avionics subsystem 100 illustrating an exemplary functional integration of the FEM-AWU 90 with the flight data recorder 32 and the integrated avionics subsystem 60 in the aircraft 84 (not shown). The flight data integration unit 34 in the integrated avionics subsystem 60 typically provides flight data to the flight data recorder in accordance with Standard ARINC 717. Standard ARINC 717 provides design guidelines for the flight data recorder (FDR) 32. Used primarily on airlines, the flight data recorder 32 provides capability to meet FAA mandatory flight data recording requirements plus other data acquisition needs. The flight data acquisition unit (FDAU) 34 samples, conditions, and digitizes or reformats the flight data. The flight data recorder 32 is the actual recorder with a crash protected medium. Other components may provide input data or be used to control the system.

The FDAU 34 time division multiplexes the data and passes it to the FDR 32 over a special continuous time division multiplexed serial data bus. Parameters are differentiated by their position (time slot address) in the data frame. It is this data bus that is implied when reference is made to an ARINC 717 data bus. Words are 12 bits long and are nominally transmitted at 64 or 256 words per second, though the specification also permits 128 and 512 words per second.

The FEM-AWU 90 receives specified flight data 102 from the flight data acquisition unit 34. A data transfer monitoring module 104 continually reviews the specified flight data 102 for potential or actual problems or anomalies with the aircraft 84 and/or with the flight data parameters of the aircraft 84. A status evaluation module 106 compares the incoming data with acceptable flight parameters 108 to determine if the potential or actual problems or anomalies are present in the aircraft 84. If a problem exists, one or more different types of status text messages may be generated by a status text module 112. A particular type or formatting of status text message may be created for a particular group of recipients.

Figure 6:
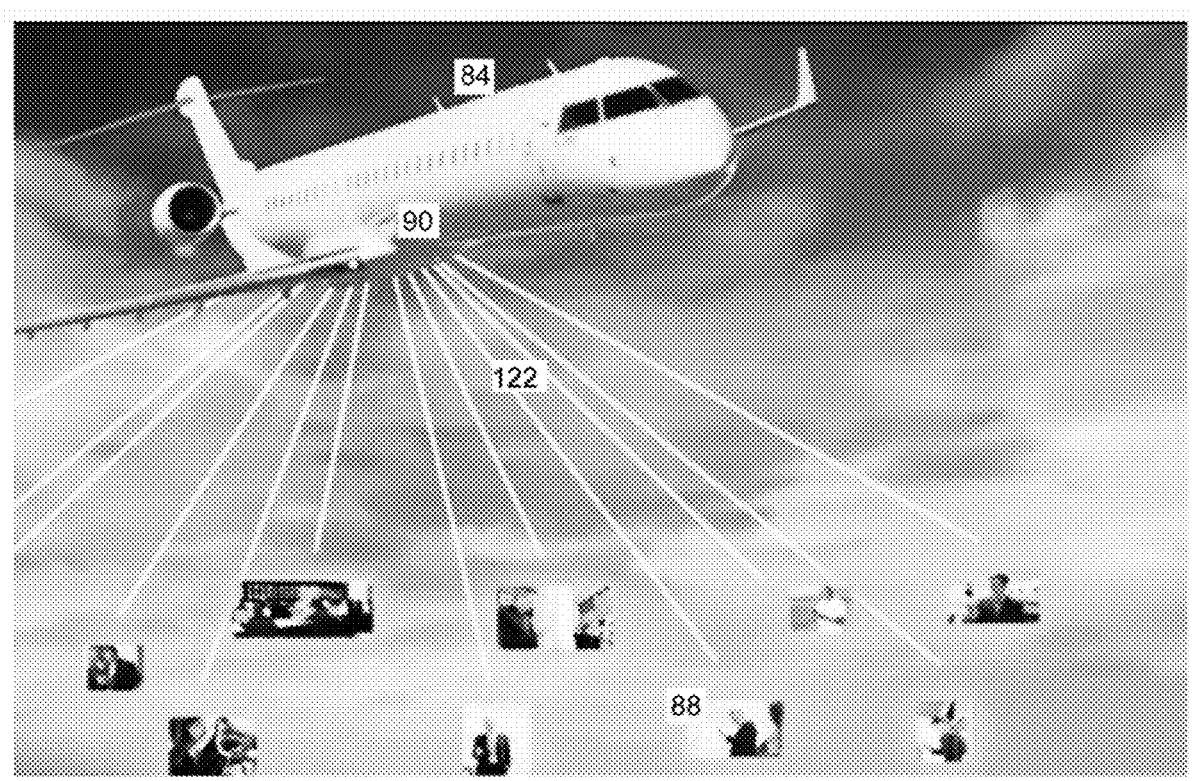
FIG. 6 is a functional block diagram of a commercial aircraft using the FDR enhancement module automatic warning unit of FIG. 5 to provide wide notification to a large number of ground-based aviation officials.

The status text messages are transmitted to ground-based recipients via a transmitter 120. In accordance with the present invention, the FEM-AWU 90 functions to parse the status text messages using one or more of simple object access protocol (SOAP), communication, short message service (SMS) gateway communication, and a short message peer to peer (SMPP) protocol, for reception by ground-based equipment (not shown). The recipients 122 of text messages may include, for example, one or more government officials 88, shown in FIG. 6. It can be appreciated by one skilled in the art that the FEM-AWU 90 provides the innovative service of notifying by text, the status of the aircraft 84, to a plurality of selected ground-based recipients 122 who otherwise could not have been immediately apprised as to a pending or actual problem occurring on the aircraft 84.

Figure 7:
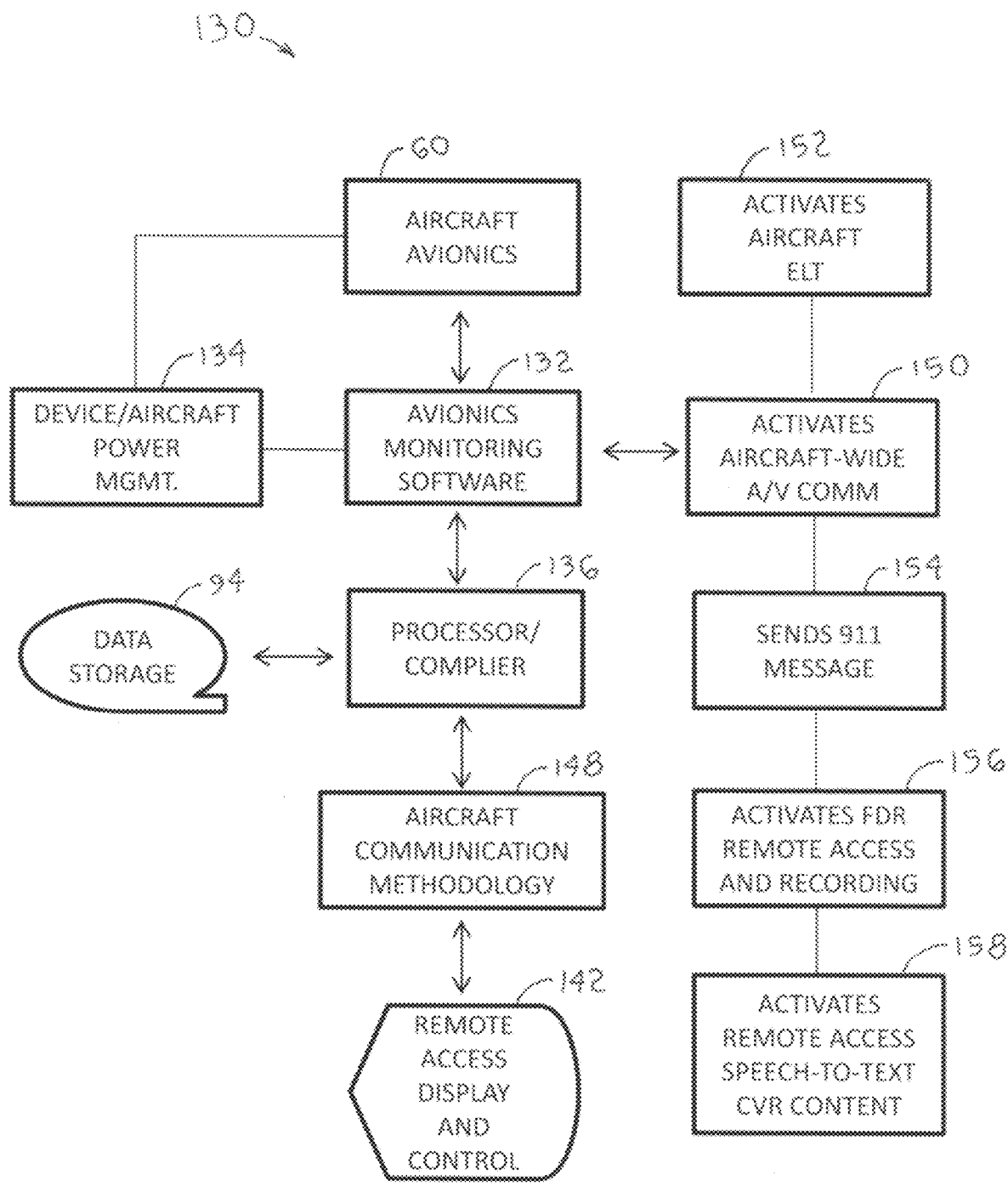
FIG. 7 is a functional block diagram of an FDR enhancement module automatic warning unit for use with a conventional aircraft avionics system, in accordance with an aspect of the present invention.

There is shown in FIG. 7 a functional block diagram of a smart FDR system 130, which performs many of the functions of the FEM-AWU 90 in FIG. 5. The smart FDR system 130 continually executes avionics monitoring software 132 to automatically obtain real-time aircraft status and flight parameters from the flight data recorder 32 and the flight data acquisition unit 34. This data is recorded and reported to ground-based facilities for immediate viewing, and/or for archiving, in accordance with pre-established criteria and procedures. The avionics monitoring software 132 acquires aircraft operating parameters by monitoring the integrated avionics subsystem 60, and by monitoring the power status of the aircraft 84 systems via a device/aircraft power management module 134. The device/aircraft power management module 134 may be configured to detect power loss to the aircraft transponder (not shown), for example.

The parameter and power data are processed by a processor/compiler 136 into a real-time reporting format suitable for convenient and clear presentation and review by authorized personnel. The real-time reports and supporting data may be continually stored in a data storage facility 138, such as the ground-based server/recorder 94 or cloud storage, while the aircraft 84 is in a flight or operating status. The real-time reports and supporting data may be transmitted to a remote access display and control module 146, such as to displays viewed by the air traffic control personnel 96 or hand-held devices used by the government officials 88, shown in FIG. 4. This function of the smart FDR system 130 and the FEM-AWU 90 provides for an automatic FDR 32 incident warning system.

As can be appreciated by one skilled in the relevant art, the smart FDR system 130, shown in FIG. 7, enables authorized personnel to receive and evaluate critical flight data without the need to physically access the flight data recorder 32. The smart FDR system 130 applies the appropriate aircraft communication methodology 148, such as by parsing the data, to send the real-time reports and supporting data via the transmitter 120, shown in FIG. 5. In an exemplary embodiment, the real-time reports and supporting data may be downloaded remotely upon a command issued by ground-based personnel.

In accordance with an exemplary embodiment, the detection by the avionics monitoring software 132 of one or more out-of-specification, or otherwise unacceptable, flight parameter measurements is communicated to an aircraft-wide audio/video communication module 150. Depending on the anomaly or unacceptable parameter detected, the aircraft-wide audio/video communication module 150 may also communicate with an aircraft ELT activation module 152 to deploy the emergency location transmitter 110. This function of the smart FDR system 130 and the FEM-AWU 90 provides for an automatic FDR 32 to ELT 110 deployment.

In an exemplary embodiment, the aircraft-wide audio/video communication module 150 may communicate with an emergency message module 154 to select a standard emergency message and transmit the selected message to the appropriate ground-based entity via the transmitter 120. For example, an automated "911" message may be sent to the air traffic control personnel 96 when the aircraft 84 is near an airport facility, or to first responders when the aircraft 84 is unable to navigate to an airstrip. Depending on the nature of the emergency, the flight data recorder 32 may also be activated by a remote access and recording module 156. A remote access speech-to-text module 158 may also be activated to provide text version of the cockpit voice recorder 40 audio to the ground-based recipients 122, as described above.

Figure 8:
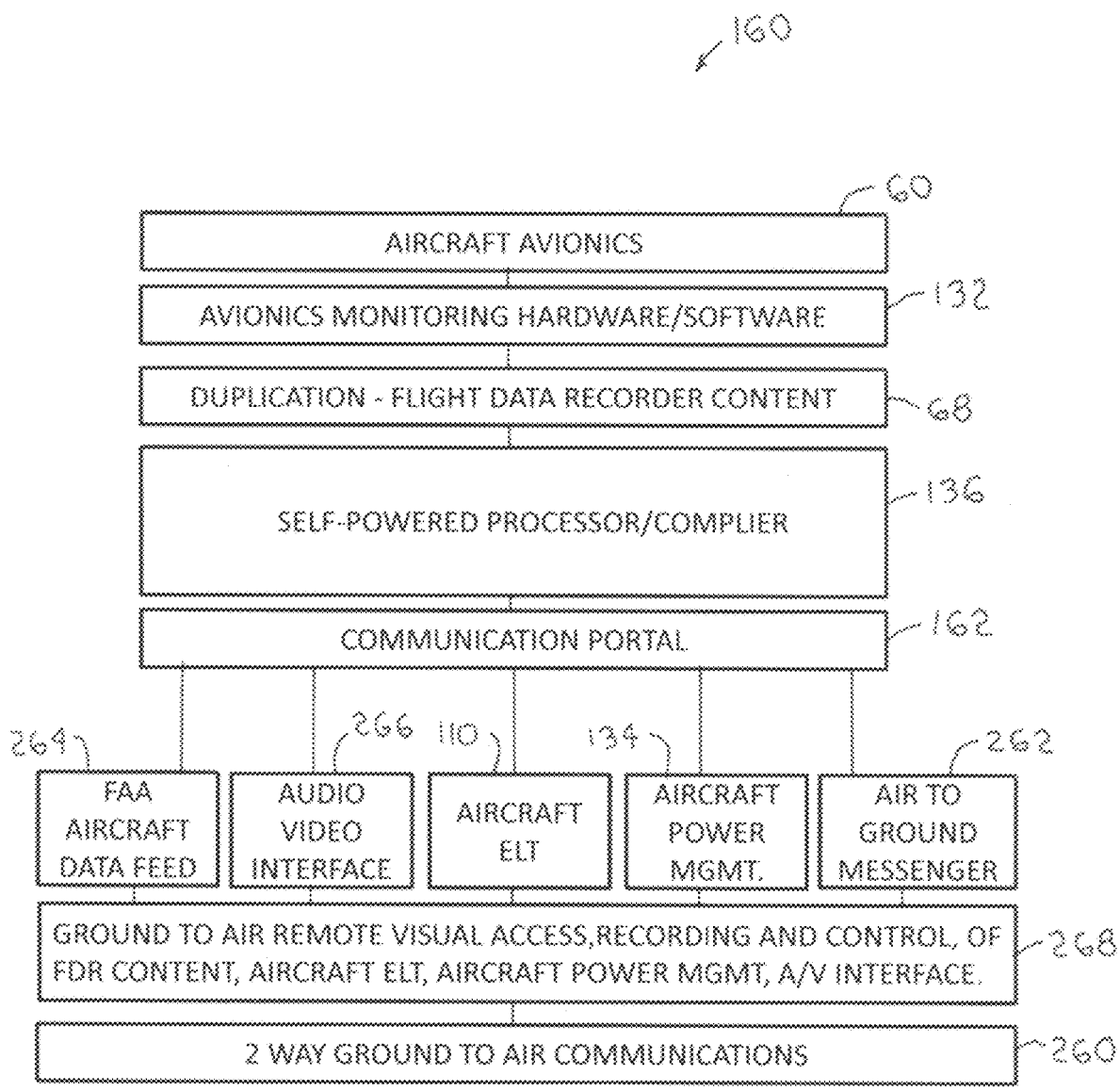
FIG. 8 is a signal flow diagram of an FDR enhancement module automatic warning unit for use with a conventional aircraft avionics system, in accordance with an aspect of the present invention.

A signal flow and function diagram 160 in FIG. 8 shows the progression of communication signals initiated by the FEM-AWU 90 of FIG. 5 and the smart FDR system 130 of FIG. 7. The aircraft avionics 60 flight parameters and data are acquired by the avionics monitoring software 132 and associated hardware. The data in the flight data recorder 32 are saved/archived in the data storage facility 138, for example, or in the ground-based server/recorder 94 to provide a duplication of flight data recorder content 68.

The processor/compiler 136 receives essential data and parameters via a communication portal 162 using the appropriate aircraft communication methodology 148 via a two-way ground-to-air communication module 260. This function of the smart FDR system 130 and the FEM-AWU 90 provides for a real-time FDR 32 "air-to-ground" access, as enabled by an air to ground messenger module 262. This configuration enables transmission of FAA aircraft data feed 264, and provides the additional, unique benefit of two-way video communication with a cockpit video camera 164, shown in FIG. 13, via an audio/video interface module 266.

The aircraft power management module 134 may communicate with the aircraft emergency location transmitter 110 through the communication portal 162. It can be appreciated by one skilled in the art that the smart FDR system 130 of FIG. 7 operates in accordance with communication functionalities 268 including, ground-to-air remote visual access, recording, and control of (i) FDR 32 content, (ii) the aircraft ELT 110, (iii) aircraft 84 power management, and (iv) the smart FDR system 130 audio/video interface 266.

FIG. 9 is an exemplary display 124 generated by the FEM-AWU 90 that indicates a possible problem on board the aircraft 84 (not shown). The information provided in the display 124 may be immediately transmitted to the selected ground-based recipients 122 as a corresponding text message that may include, for example, a short description 126 of the problem detected in the aircraft 84, and flight details 128 that give the current altitude, bearing, speed, and coordinates of the aircraft 84.

Figure 10:
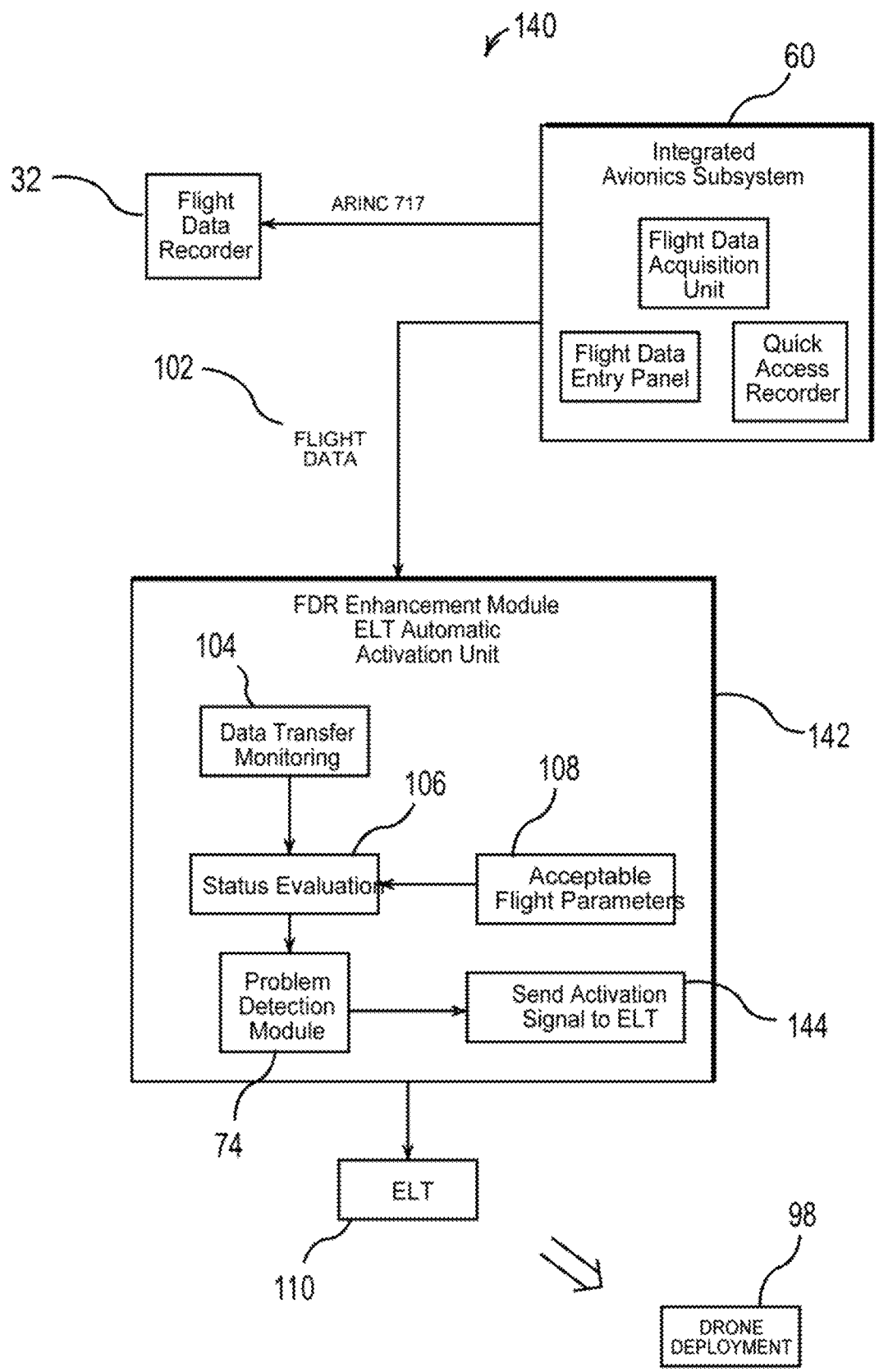
FIG. 10 is an operating diagram of an ELT automatic activation unit for use with a conventional aircraft avionics system, in accordance with an aspect of the present invention.

FIG. 10 is an operating diagram of an enhanced avionics subsystem 140 illustrating an exemplary functional integration of an FDR enhancement module ELT automatic activation unit (FEM-EAAU) 142 with the flight data recorder 32 and the integrated avionics subsystem 60 for use in the aircraft 84, shown in FIG. 4. The FEM-EAAU 142 receives the specified flight data 102 from the flight data acquisition unit 34. The data transfer monitoring module 104 continually reviews the specified flight data 102 for potential or actual problems with the aircraft 84. The status evaluation module 106 compares the incoming flight data 102 with the acceptable flight parameters 108 to determine if the potential or actual problems are present in the aircraft 84. If one or more problems are detected in a problem detection unit 74, an activation signal may be sent to an on-board emergency location transmitter (ELT) 150 from an ELT activation signal module 144. The ELT 150 may issue a signal to deploy the emergency drone 98.

Figure 11:
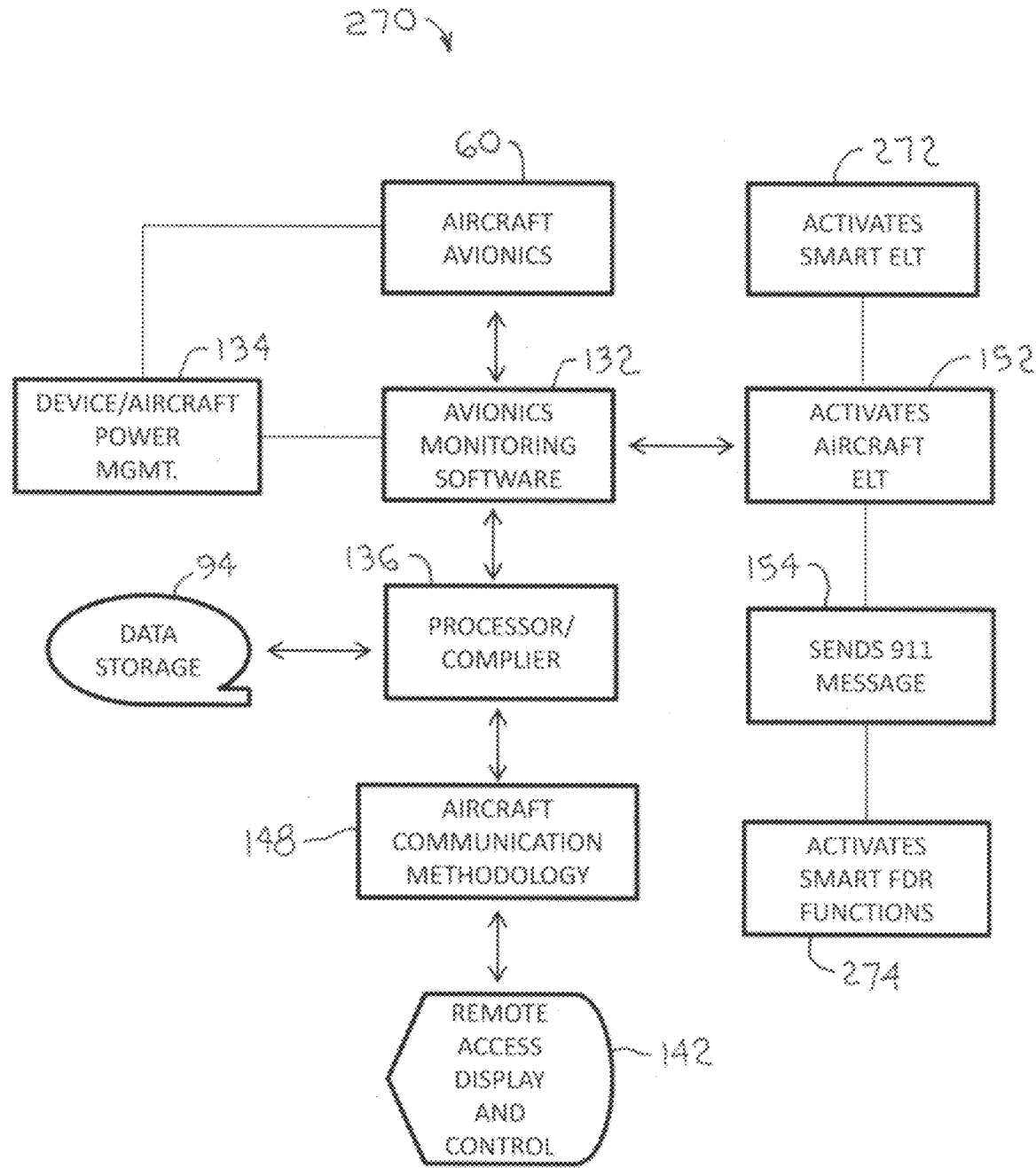
FIG. 11 is a functional block diagram of an ELT automatic activation unit for use with a conventional aircraft avionics system, in accordance with an aspect of the present invention.

There is shown in FIG. 11 a functional block diagram of a smart ELT system 270. The smart ELT system 270 can function independently of the conventional aircraft emergency location transmitter 110, and can be selectively wired, or wirelessly connected to components in the aircraft avionics 60. As can be appreciated by one skilled in the art upon reviewing the disclosed smart ELT system 270 below, the smart ELT system 270 is a unique ELT system and avionics monitoring system that can be activated by one or more avionics anomalies detected by the aircraft FDR 32, by the smart FDR system 130 described above, or a smart ADS-B system 300 described below.

The smart ELT system 270 continually executes avionics monitoring software 132 to acquire real-time aircraft status and flight parameters. This data is recorded and reported to ground-based facilities for immediate viewing, and/or for archiving, in accordance with pre-established criteria and procedures. The avionics monitoring software 132 acquires real-time aircraft operating parameters by monitoring the integrated avionics subsystem 60, and by monitoring the power status of the aircraft 84 systems via a device/aircraft power management module 134. The processor/compiler 136 receives essential data and parameters using the the appropriate aircraft communication methodology 148 via a remote access display and control module 146. For example, the smart ELT system 270 may react to imminent display notifications generated by a terrain awareness and warning system (TAWS) and/or an engine-indicating and crew-alerting system (EICAS).

The avionics monitoring software 132 is configured to communicate with a smart ELT activation module 272 or the aircraft activation module 152. This configuration enables transmission of a '911" emergency transmittal, via the emergency message module 154, or activating the smart FDR 130, shown in FIG. 7, by means of a smart FDR activation module 274. The emergency message transmittal may result from equipment malfunction or be triggered from a fire detection sensor (not shown).

Figure 12:
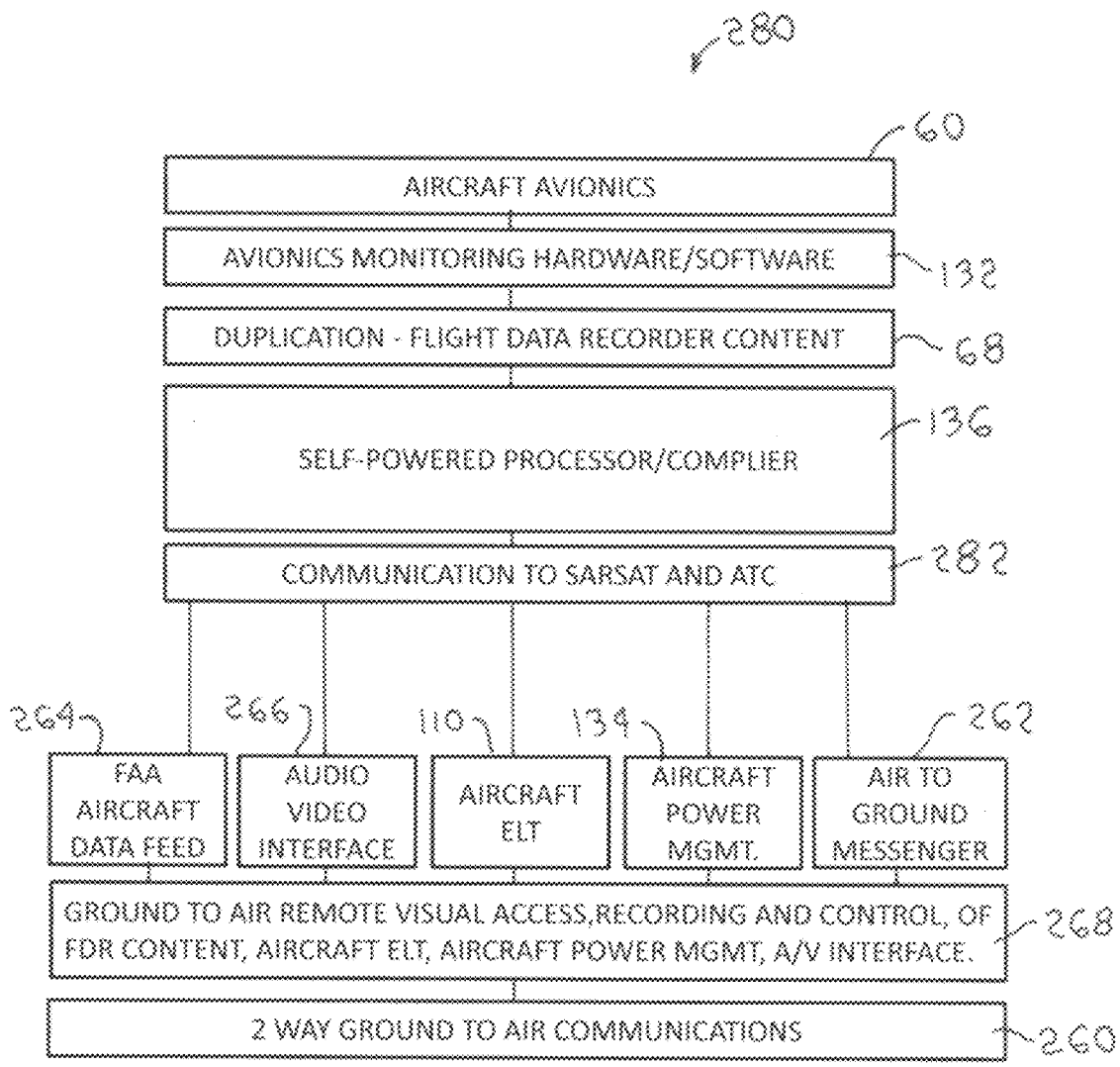
FIG. 12 is a signal flow diagram of an ELT automatic activation unit for use with a conventional aircraft avionics system, in accordance with an aspect of the present invention.

As shown in FIG. 12, the smart ELT system 270 may function in accordance with a signal flow and function diagram 280 showing the progression of communication signals initiated by the FEM-EAAU 142 of FIG. 10 and the smart ELT system 270 of FIG. 11. The aircraft avionics 60 flight parameters and data are acquired by the avionics monitoring software 132 and associated hardware. The data in the flight data recorder 32 are saved/archived in the data storage facility 138, for example, or in the ground-based server/recorder 94 to provide a duplication of flight data recorder content 68.

The self-powered processor/compiler 136 receives essential data and parameters via the communication portal 162 using the the appropriate aircraft communication methodology 148 via the two-way ground-to-air communication module 260. This function of the smart ELT system 270 and the FEM-EAAU 142 provides for a real-time FDR 32 "air-to-ground" access, as enabled by an air to ground messenger module 262. This configuration enables transmission of FAA aircraft data feed 264, and provides the additional, unique benefit of two-way video communication with a cockpit video camera 164, shown in FIG. 13, via an audio/video interface module 266. The smart ELT system 270 may also be configured to automatically deploy for certain, pre-specified flight emergencies such as loss of power to the aircraft 84 transponder.

The smart ELT system 270 additionally includes capabilities in an ATC/SARSAT communication module 282 for specific two-way communication with the air traffic control personnel 96 and satellite-based search and rescue systems (e.g., COSPAS-SARSAT). This feature allows the air traffic control (ATC) personnel 96 to remotely activate or reset the smart ELT system 270. Remote activation of the smart ELT system 270 can also occur, for example, when: (i) the aircraft 84 disappears from the ATC monitoring system; (ii) the aircraft 84 squawks "7700," "7600," or "7500;" (iii) a "Mayday" call is received from the aircraft 84; or (iv) communication with the aircraft 84 is lost.

As described above, the aircraft power management module 134 communicates with the aircraft emergency location transmitter 110 through the communication portal 162. The smart ELT system 270 of FIG. 11 operates in accordance with the communication functionalities 268. As described above, this functionality includes: ground-to-air remote visual access, recording, and control of (i) FDR 32 content, (ii) the aircraft ELT 110, (iii) aircraft 84 power management, and (iv) the smart FDR system 130 audio/video interface 266. This advantageous feature is enabled by the two-way ground-to-air communication module 260, where the communication function includes parsing of the communication transmissions using one or more of: simple object access protocol communication, short message service gateway communication, and short message peer-to-peer protocol.

Figure 13:
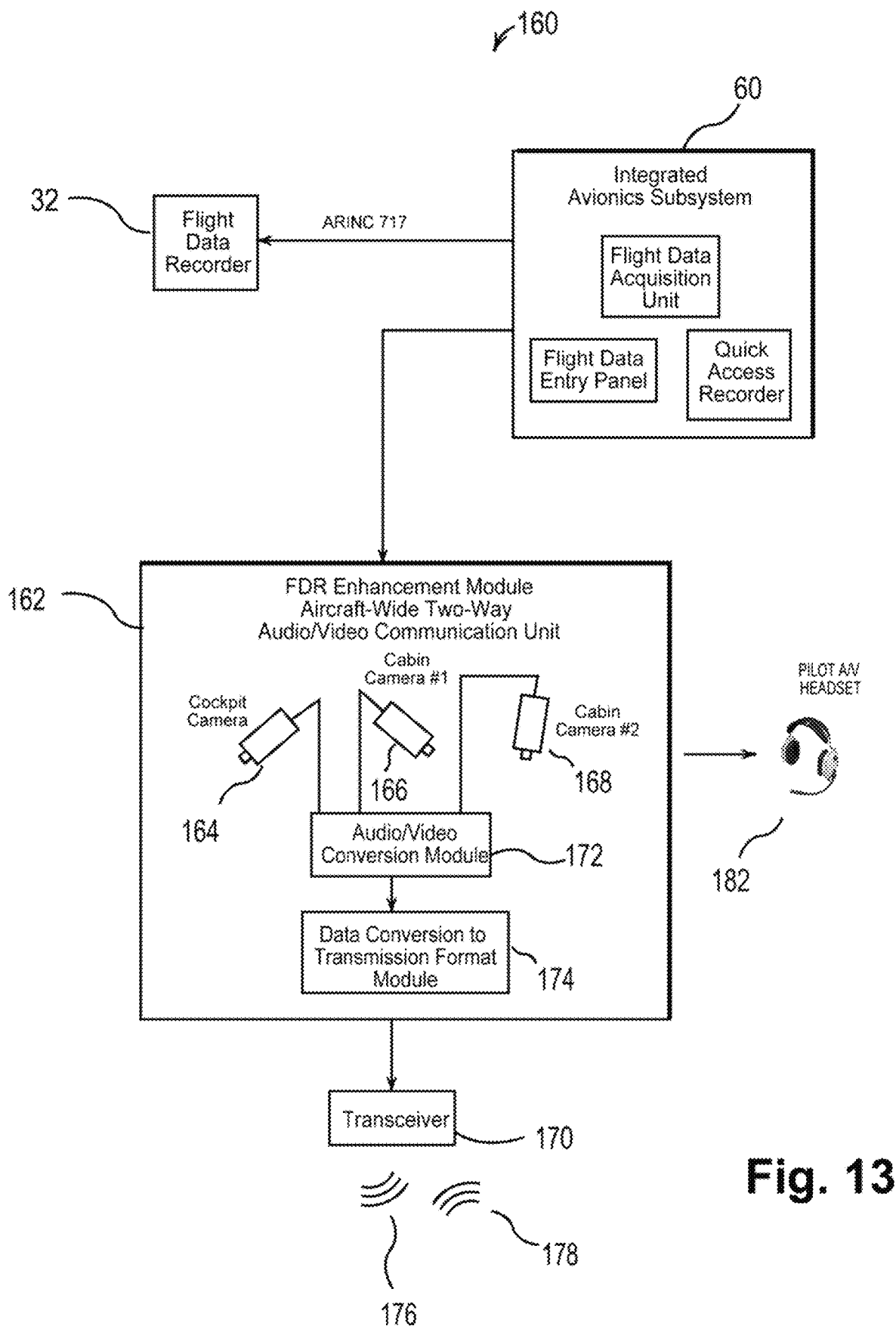
FIG. 13 is a diagrammatical illustration of an enhanced avionics subsystem including an FDR enhancement module aircraft-wide two-way audio/video communication unit, in accordance with an aspect of the present invention.

FIG. 13 diagrammatically illustrates an enhanced avionics subsystem 160 with an exemplary functional integration of a FDR enhancement module aircraft-wide two-way audio/video communication unit (FEM-2W-AN) 162 for use in the commercial aircraft 84, shown in FIG. 4. The FEM-2W-AN 162 includes at least one cockpit video camera 164 and one or more cabin cameras 166, 168. Audio and video feed from the video cameras 164, 166, 168 are converted into transmission formatted data 176 by a data to/from a transmission conversion module 174. In accordance with the present invention, the FEM-2W-AN 162 functions to parse the audio and video feed using one or more of simple object access protocol (SOAP), communication, short message service (SMS) gateway communication, and a short message peer to peer (SMPP) protocol, for reception by ground-based equipment (not shown).

The transmission formatted data 176 is transmitted to ground-based personnel via a transceiver 170 using conventional methods including, for example, the Internet or satellite communication. Ground-based audio/video communication data 178, sent by air traffic control personnel 96, for example, may be received by the transceiver 170 as part of a two-way communication session between the air traffic control personnel 96 and the pilot of the aircraft 84. The received signals may be converted into audio/video format by the audio/video conversion module 172, for transmission to a pilot's audio/video headset 182, for example.

Figure 14:
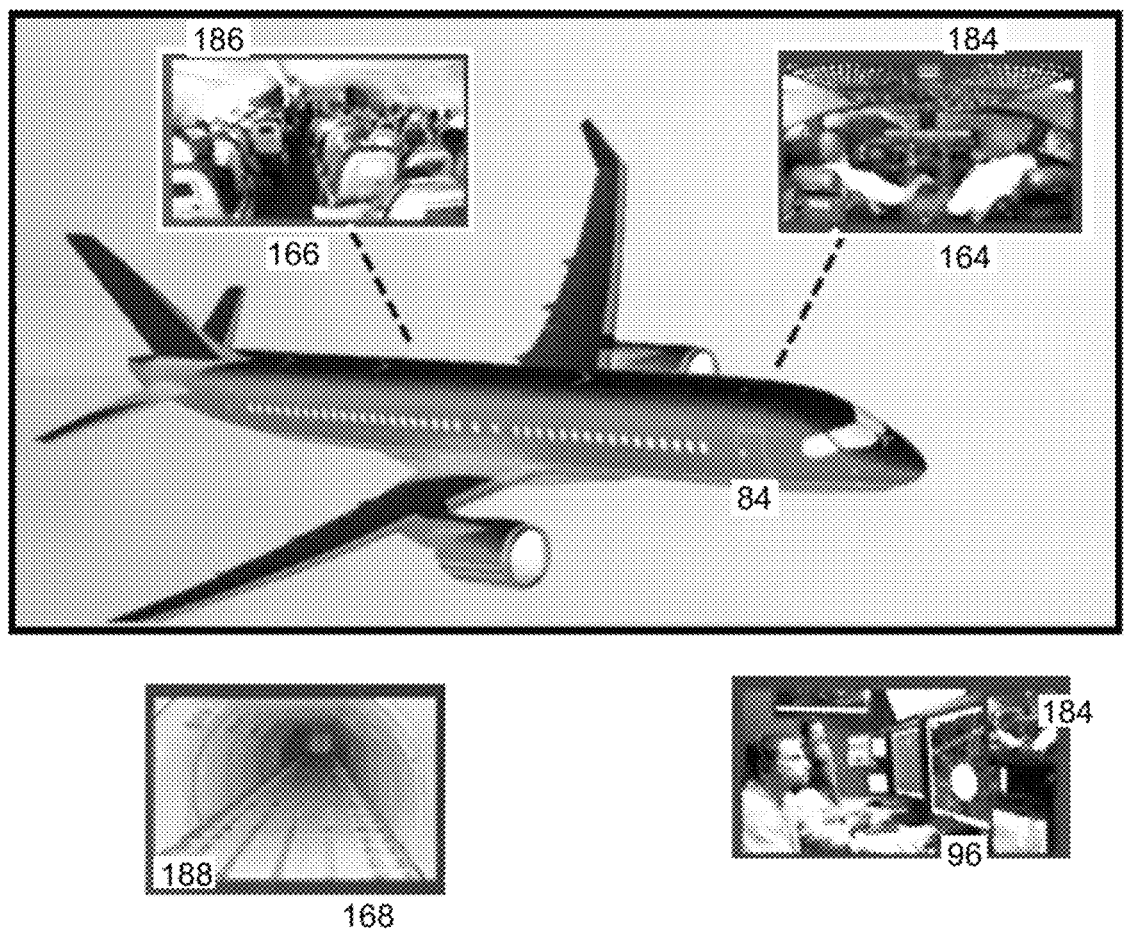
FIG. 14 is an illustration showing exemplary locations of and images transmitted by the on-board video cameras of FIG. 9, in accordance with an aspect of the present invention.

FIG. 14 is an illustration showing exemplary images transmitted by the on-board video cameras 164, 166, and 168 of FIG. 13, in accordance with an aspect of the present invention. In the illustration provided, the cockpit camera 164 is broadcasting a real-time view 184 of the cockpit in the aircraft 84. The cabin camera 166 is broadcasting a view 186 from the rear of the passenger seating area, and the cabin camera 168 is broadcasting a view 188 of the cargo area. The air traffic control personnel 96 have selected the cockpit view 184 for display while communicating with the flight personnel in the aircraft 84.

Figure 15:
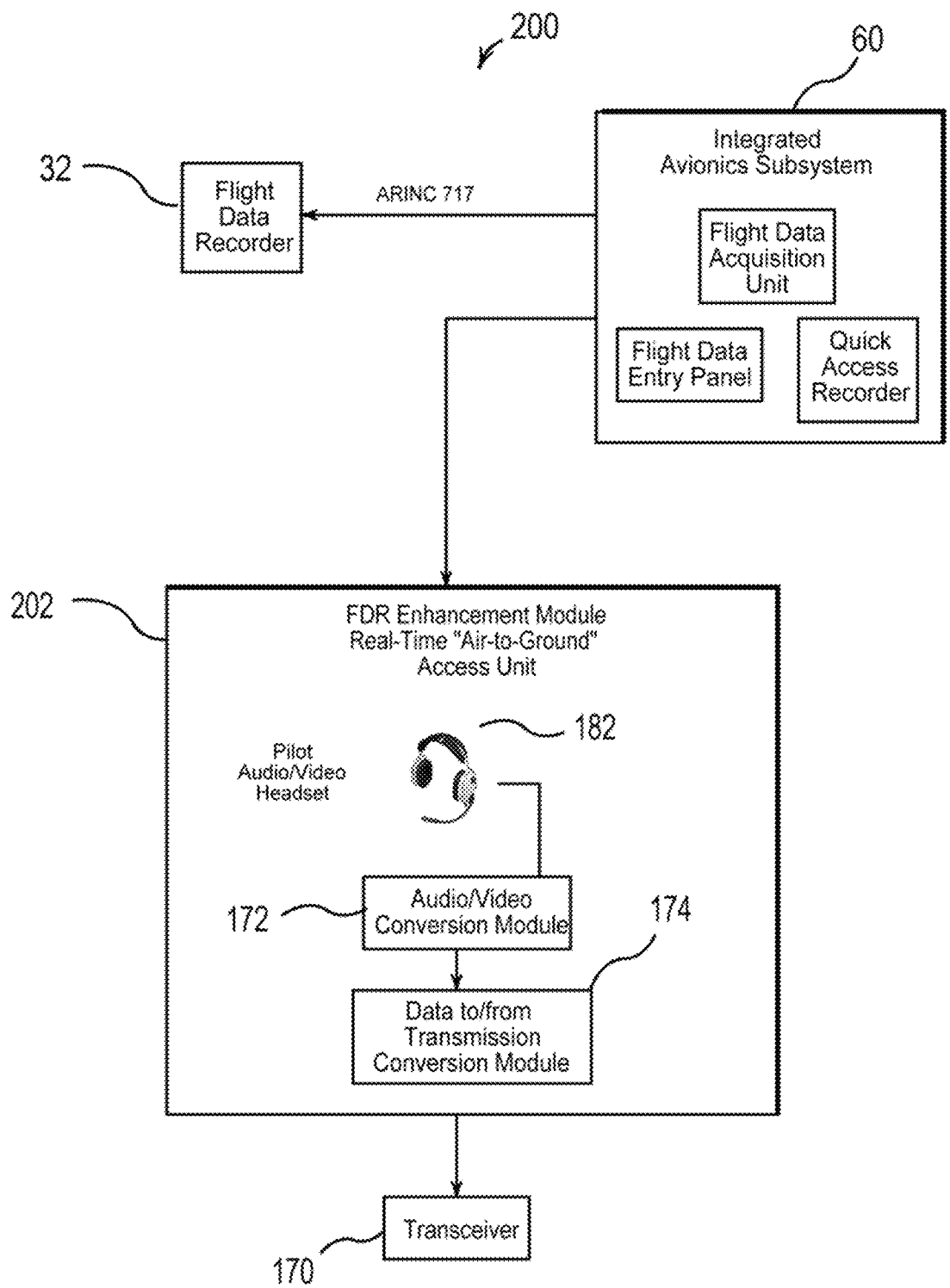
FIG. 15 is an operating diagram of an FDR enhancement module real-time air-to-ground access unit including an on-board audio-visual conversion module for data conversion from a pilot audio/visual headset, in accordance with an aspect of the present invention.

FIG. 15 shows an operating diagram of an enhanced avionics subsystem 200 illustrating an exemplary functional integration of an FDR enhancement module real-time air-to-ground access unit (FEM-RT-AU) 202 for use in the commercial aircraft 84, shown in FIG. 4. The FEM-RT-AU 202 includes the on-board audio-visual conversion module 172 for data conversion from the pilot's audio/visual headset 182, in accordance with an aspect of the present invention. The converted data is prepared for transmission to ground-based units by the data to/from transmission conversion module 174. The transmission conversion module 174 functions to parse the converted data using one or more of SOAP communication, SMS gateway communication, and SMPP protocol, for reception by ground-based communication devices, such as shown in FIG. 4.

Figure 16:
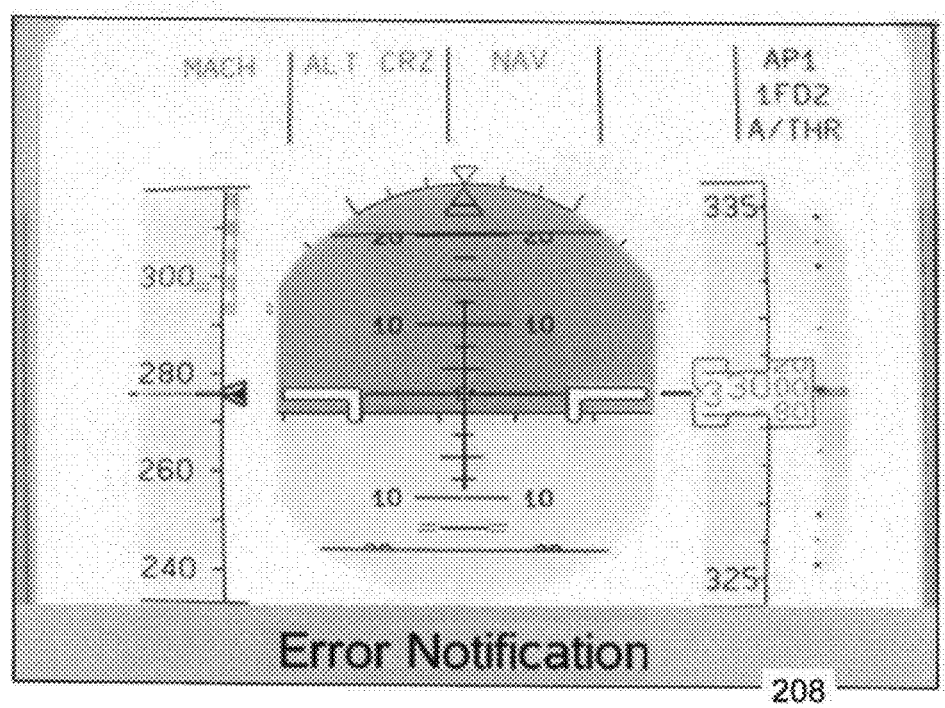
FIG. 16 is an illustration of a real-time instrument display available to air traffic control personnel, in accordance with the present state of the art.

The transceiver 170 functions to provide communication with a real-time, air-to-ground access capability. As noted above, FIG. 14 illustrates a scenario in which air traffic control personnel 96 have established communication with the crew of the aircraft 84 and have selected a view 184 of the cockpit for display. Alternatively, as shown in FIG. 16, the air traffic control personnel 96 can select, for example, a view 208 of a real-time aircraft instrument display replicated on a local air traffic controller (ATC) monitor 206, for example, in accordance with the present invention.

Figure 17:
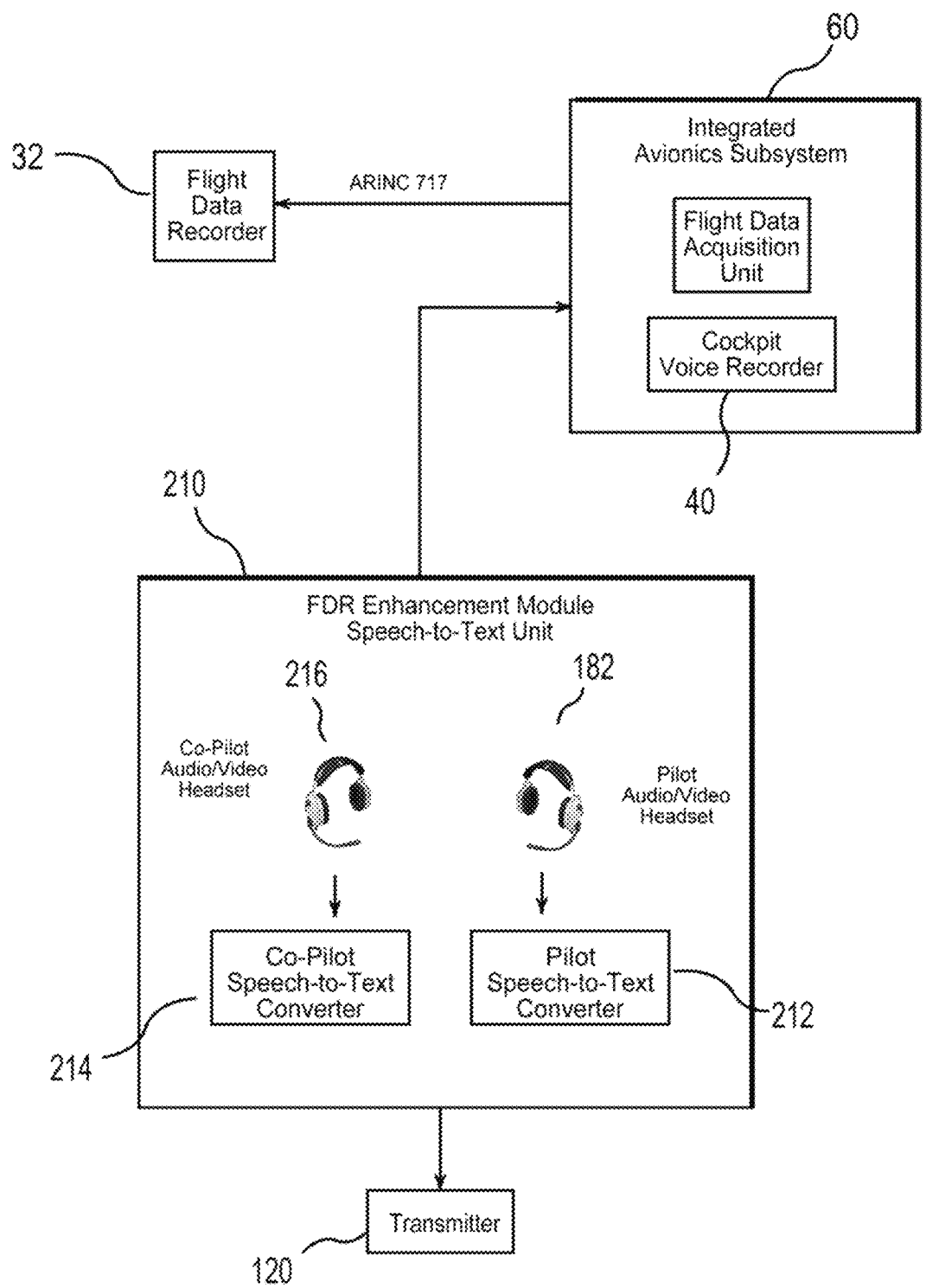
FIG. 17 is an operating diagram of an FDR enhancement module speech-to-text unit including an on-board speech-to-text converter module for text conversion from a pilot's audio/visual headset and a co-pilot's audio/visual headset, in accordance with an aspect of the present invention.

FIG. 17 shows an operating diagram of an FDR enhancement module speech-to-text unit (FEM-STT) 210 for use in the commercial aircraft 84, shown in FIG. 4. The FEM-STT 210 includes a pilot on-board speech-to-text converter module 212 for text conversion from the pilot's audio/visual headset 182, and a co-pilot on-board speech-to-text converter module 214 for text conversion from a co-pilot's audio/visual headset 216, in accordance with an aspect of the present invention. The audio from the pilot's audio/visual headset 182 and from the co-pilot's audio/visual headset 216 may be recorded in the cockpit voice recorder (CVR) 40, as per standard procedure. However, as can be appreciated by one skilled in the art, the amount of audio data stored in the cockpit voice recorder 40 is limited to a pre-specified amount of time, such as two hours. In addition, the process of reviewing the audio record obtained from the cockpit voice recorder 40 to find a particular topic may be a tedious manual process.

The FEM-STT 210 functions to convert the audio from the pilot's audio/visual headset 182 and the audio from the co-pilot's audio/visual headset 216 into text that can be displayed on a ground-based computer screen (not shown) or on the display screen of a ground-based communication device (not shown). The FEM-STT 210 functions to parse the audio text using one or more of simple object access protocol communication, short message service gateway communication, and a short message peer to peer protocol. The parsed audio text may be sent to a ground-based device via the transmitter 120. This operation serves to overcome the shortcomings of the present art as described above. The displayed text can be quickly reviewed for potential problematic issues on the aircraft 84. Also, the ground-based recipient can review the transmitted text in essentially real time.

Figure 18:
FIG. 18 illustrates a screen display of audio output from a cockpit voice recorder, in accordance with the present state of the art.
Figure 19:
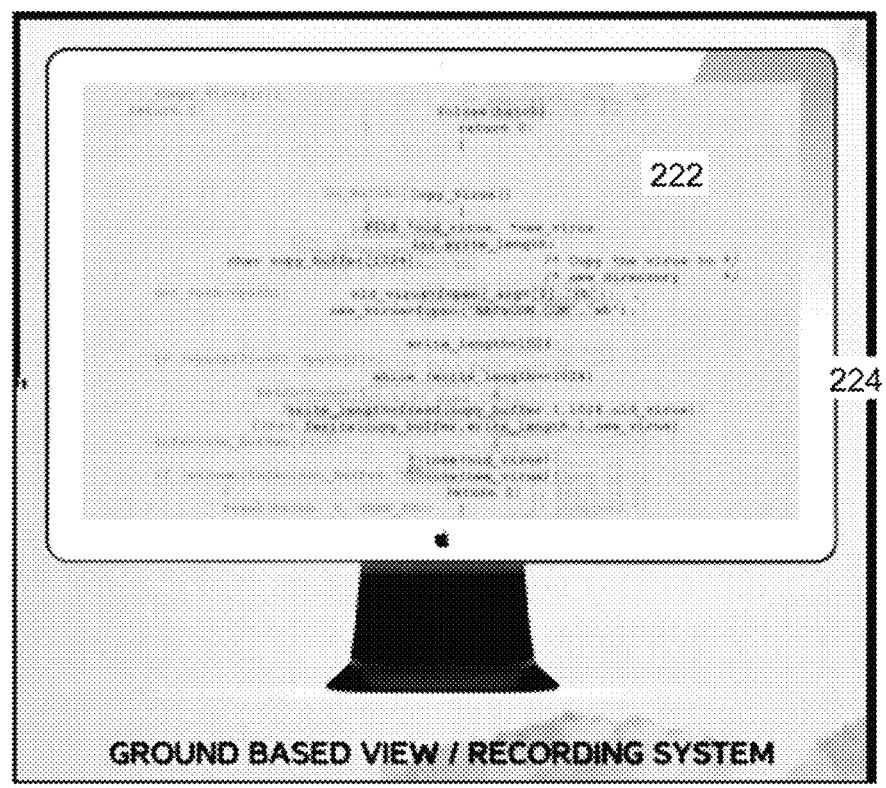
FIG. 19 illustrates a screen display of text output converted from the audio cockpit voice output of FIG. 15, in accordance with an aspect of the present invention.

FIG. 18 is an exemplary illustration of a CVR waveform 218 produced by the audio from the pilot's audio/visual headset 182 in FIG. 17. After the audio corresponding to the waveform 218 has been processed by the FEM-STT 210, there may be produced a corresponding audio text 222 on a ground-based display screen 224, such as the monitor of a computer, as seen in FIG. 19.

Figure 20:
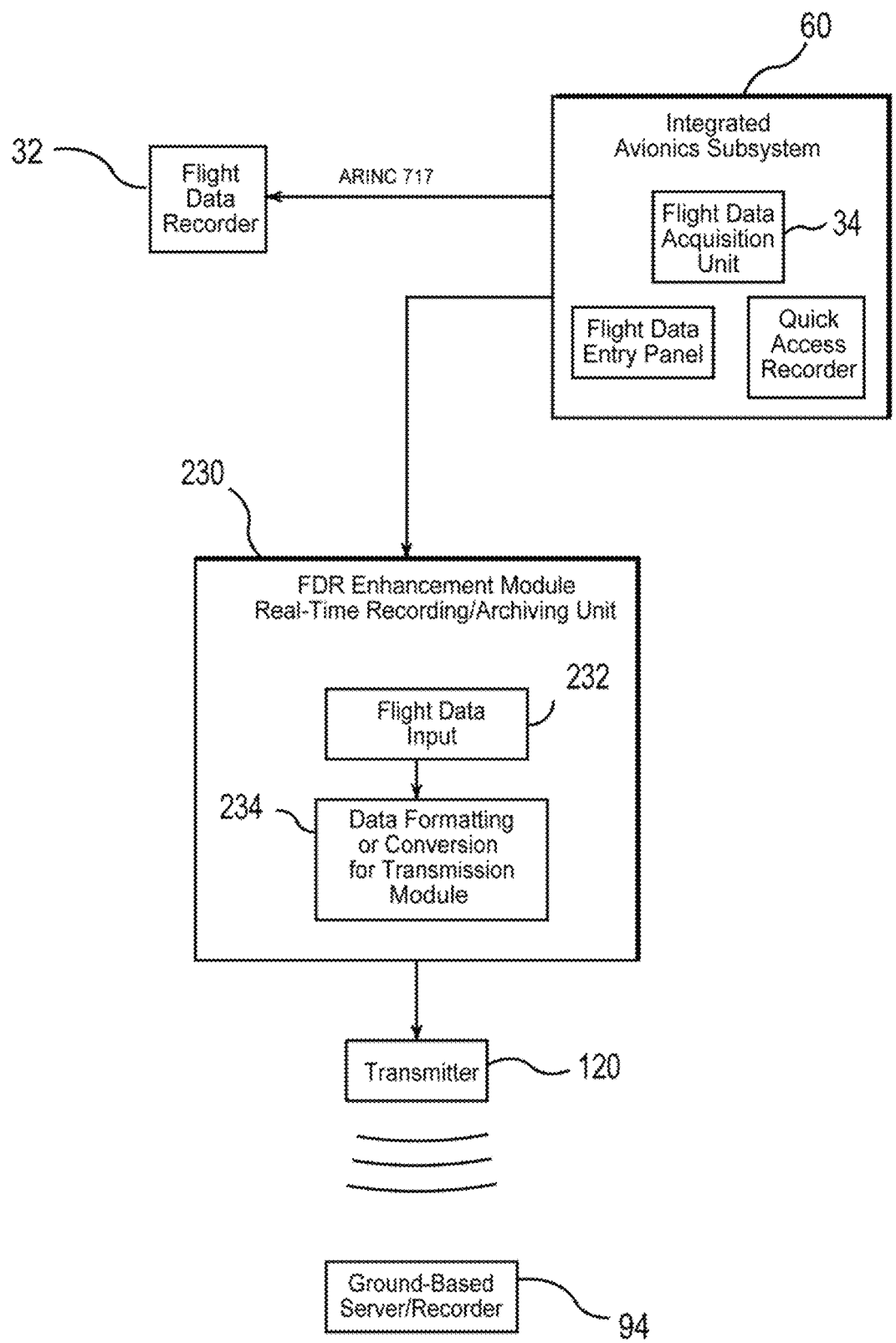
FIG. 20 is an operating diagram of an FDR enhancement module real-time recording/archiving unit converting flight data into a format for transmitting to a ground-based receiver, in accordance with an aspect of the present invention.

FIG. 20 is an operating diagram of an FDR enhancement module real-time recording/archiving unit (FEM-RT-R/A) 230 for use in the commercial aircraft 84, shown in FIG. 4. The FEM-RT-R/A 230 converts aircraft flight data into a format that enables transmission to a ground-based receiver or communication device, in accordance with an aspect of the present invention. The FEM-RT-R/A 230 includes a flight data input module 232 that receives selected flight data from the flight data acquisition unit 34. The selected flight data is sent to a data formatting or conversion for transmission (DFCT) module 234. The converted data may then be transmitted to the ground-based server/recorder 94 by way of the transmitter 120.

Figure 21:
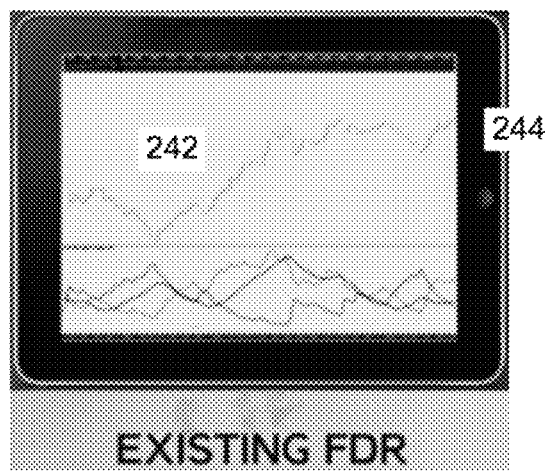
FIG. 21 illustrates a display screen showing output data curves obtained from the flight data recorder, in accordance with the present state of the art.
Figure 22:
FIG. 22 illustrates a ground-based view of the output data curves of FIG. 18, in accordance with an aspect of the present invention.

FIG. 21 is an exemplary illustration of a plurality of signal waveforms 242 as may be displayed on a conventional FDR screen 244 located in the aircraft 84. FIG. 22 is a representation of a plurality of waveforms 246 replicated from the aircraft FDR 32, as may be displayed on a ground-based display screen 248 after the signal waveforms 242 have been processed and transmitted by the FEM-RT-R/A 230 via the transmitter 120.

Figure 23:
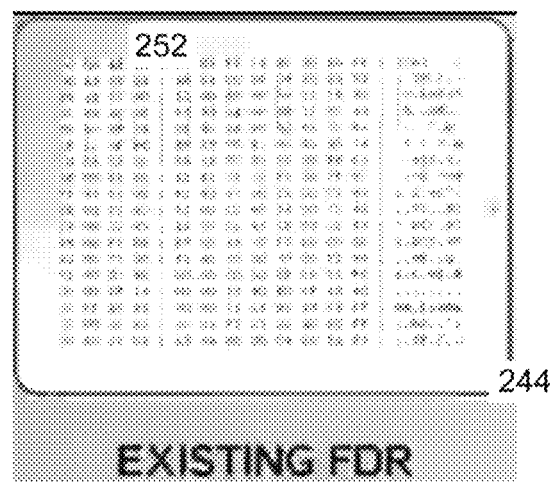
FIG. 23 illustrates a display screen showing tabulated output data obtained from the flight data recorder, in accordance with the present state of the art.
Figure 24:
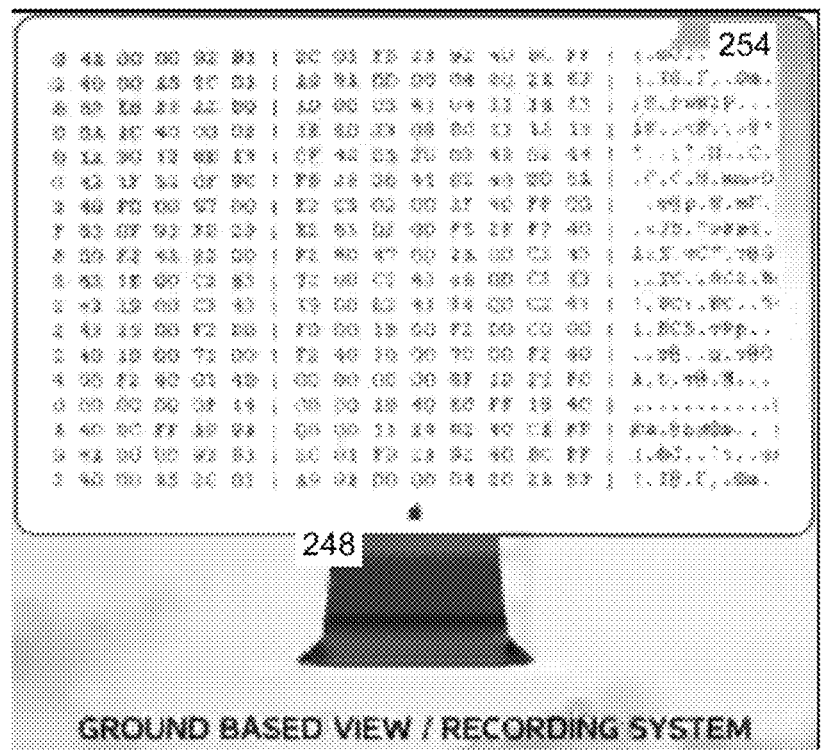
FIG. 24 illustrates a ground-based view of the tabulated output data of FIG. 20, in accordance with an aspect of the present invention.

FIG. 23 is an exemplary illustration of a data listing 252 as may be displayed on a conventional FDR screen 244 for viewing in the aircraft 84. FIG. 24 is a representation of a data listing 254 as may be displayed on the ground-based display screen 248 after the data listing 252 displayed on the FDR screen 244 has been processed and transmitted by the FEM-RT-R/A 230 and the transmitter 120. As can be appreciated by one skilled in the art, the data listing 252 is available to ground-based authorities in real time, and does not require physical access to the FDR 32 as in the present state of the art.

Figure 25:
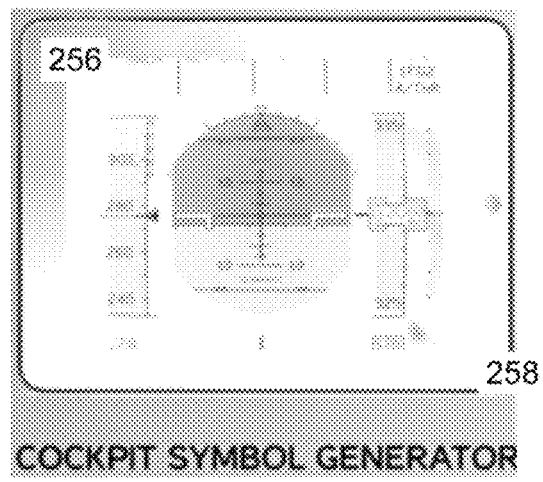
FIG. 25 illustrates an instrument display generated in the cockpit of a commercial airline, in accordance with the present state of the art.
Figure 26:
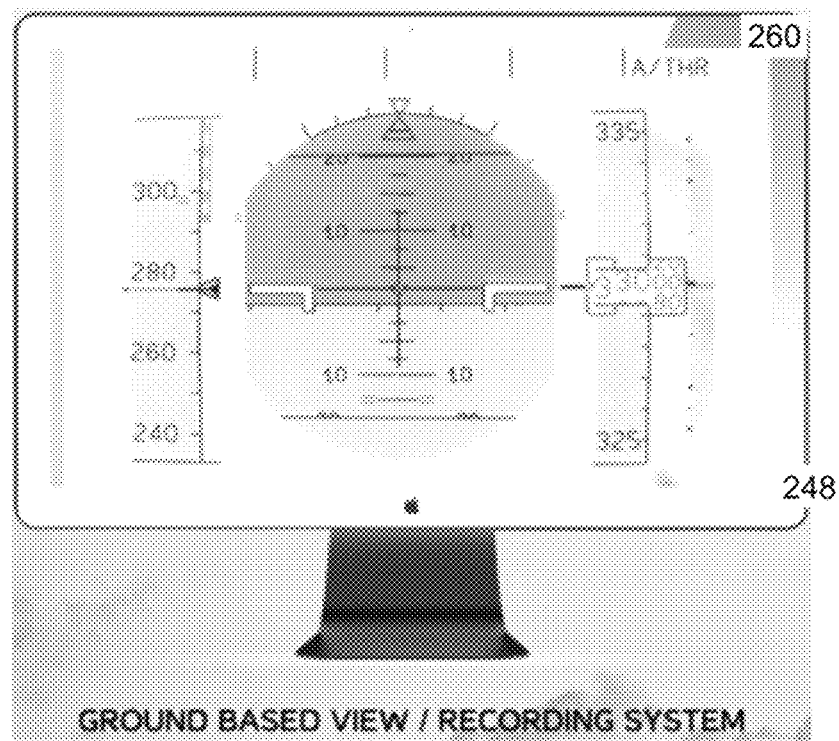
FIG. 26 illustrates a ground-based view of the cockpit instrument display of FIG. 22, in accordance with an aspect of the present invention.

FIG. 25 is an exemplary illustration of a cockpit signal generator 252 as may be displayed on the instrument panel 258 of the aircraft 84. FIG. 26 is a representation of the cockpit signal generator 252 as may be displayed on the ground-based display screen 248 after the image of the cockpit signal generator 252 has been processed and transmitted by the FEM-RT-R/A 230 via the transmitter 120. As can also be appreciated by one skilled in the art, the information displayed on the cockpit signal generator 252 is thus available to ground-based authorities in real time, and does not require physical access to the cockpit of the aircraft 84, as in the present state of the art.

Figure 27:
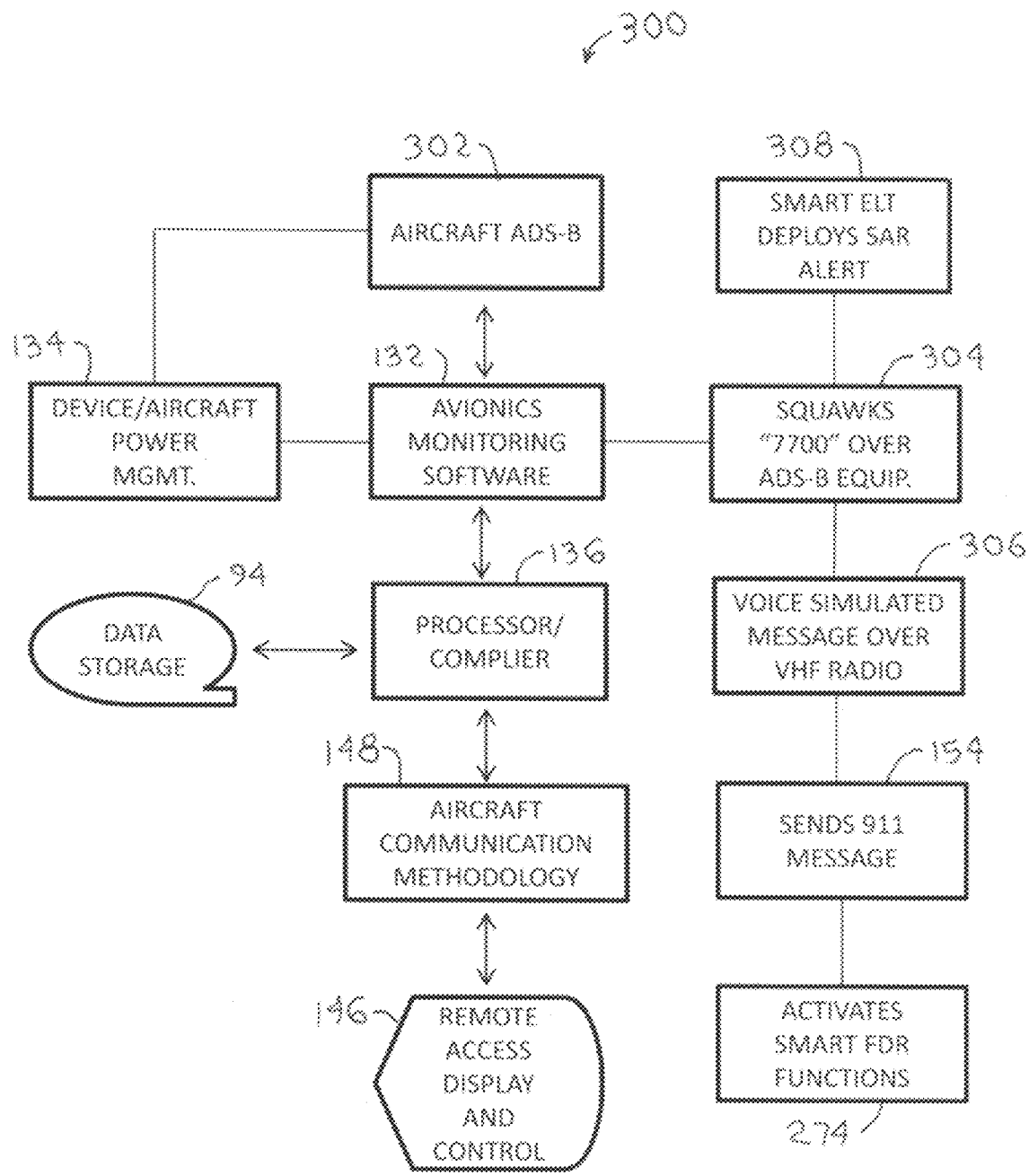
FIG. 27 is a functional block diagram of an ADS-B unit for use with a conventional aircraft avionics system, in accordance with an aspect of the present invention.

FIG. 27 is a smart Automatic Dependent Surveillance-Broadcast (ADS-B) system 300 functional block diagram, in accordance with an aspect of the present invention. The conventional ADS-B system is a replacement or supplemental system for the traditional aircraft radar-based surveillance system. Traditional ground based radar is used to interrogate an airborne aircraft and determine the real-time, in-flight coordinates. An aircraft using ADS-B does not rely on ground-based radar but instead uses the global positioning system (GPS) to determine aircraft coordinates, and may then automatically report the coordinates to a ground-based facility. The aircraft ADS-B broadcast service may also be received by other airborne aircraft, as well as by air traffic control (ATC) facilities on the ground.

The smart ADS-B system 300 continually executes avionics monitoring software 132 to acquire real-time aircraft status and flight parameters. This data is recorded and reported to ground-based facilities for immediate viewing, and/or for archiving, in accordance with pre-established criteria and procedures. The avionics monitoring software 132 acquires aircraft operating parameters by monitoring the aircraft ADS-B system 302, and by monitoring the power status of the aircraft 84 systems via the device/aircraft power management module 134. The processor/compiler 136 receives essential data and parameters using the the appropriate aircraft communication methodology 148 via a remote access display and control module 146.

The avionics monitoring software 132 is configured to communicate with an ADS-B squawks module 304 and a search-and-rescue module aircraft activation module 306. When a power anomaly or an out-of specification flight parameter is detected by the device/aircraft power management module 134 or by the aircraft ADS-B system 302, the avionics monitoring software 132 may instruct the ADS-B squawks module 304 to issue a "7700" squawks over the aircraft ADS-B system 302. In an exemplary embodiment, a SAR alert may be deployed by the search-and-rescue module aircraft activation module 306.

In response to a specified emergency condition, a voice message module 306 may transmit an emergency voice-simulated message over a frequency-modulated (FM) radio band. In addition, a "911" call may be placed from the emergency message module 154. These actions may further activate the functions of the smart FDR 130, in FIG. 7, by a smart FDR activation module 274.

Figure 28:
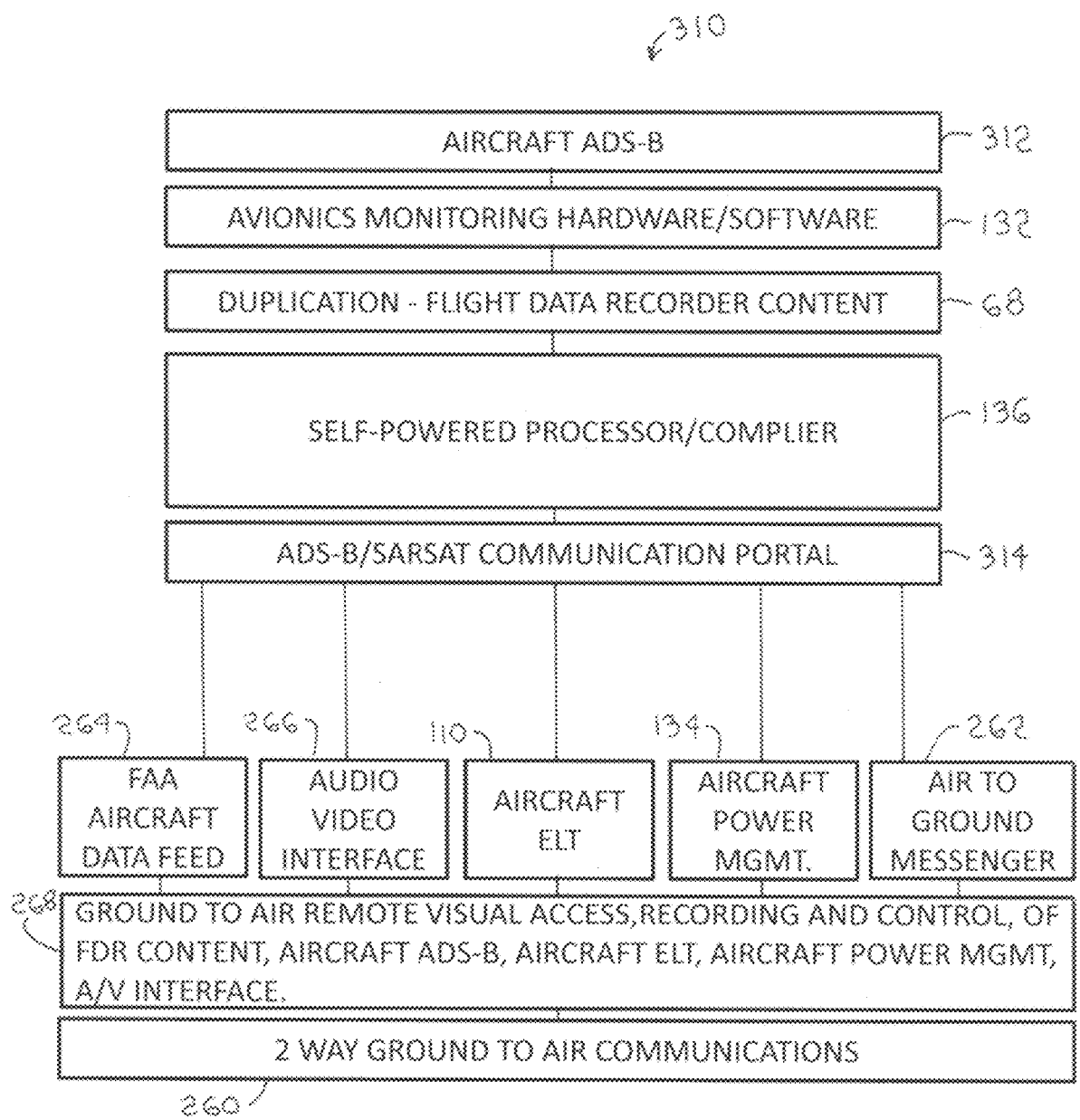
FIG. 28 illustrates a ground-based view of the cockpit instrument display of FIG. 22, in accordance with an aspect of the present invention.

As shown in FIG. 28, the smart ADS-B system 300 may function in accordance with a signal flow and function diagram 310 showing the progression of communication signals initiated by the smart ADS-B system 300 of FIG. 27. The aircraft ADS-B avionics 312 data are acquired by the avionics monitoring software 132 and associated hardware. The data in the flight data recorder 32 are saved/archived in the data storage facility 138, for example, or in the ground-based server/recorder 94 to provide a duplication of flight data recorder content 68.

The self-powered processor/compiler 136 receives essential data and parameters via an ADS-B/SARSAT communication portal 314 using the the appropriate aircraft communication methodology 148 via the two-way ground-to-air communication module 260. This function of the smart ADS-B system 300 provides for a real-time FDR 32 "air-to-ground" access, as enabled by an air to ground messenger module 262. This configuration enables transmission of FAA aircraft data feed 264, and provides the additional, unique benefit of two-way video communication with a cockpit video camera 164, shown in FIG. 13, via an audio/video interface module 266.

The smart ADS-B system 300 of FIG. 27 operates through an ADS-B/SARSAT communication portal 314 in accordance with the communication functionalities 268. As described above, this functionality includes: ground-to-air remote visual access, recording, and control of (i) FDR 32 content, (ii) the aircraft ELT 110, (iii) aircraft 84 power management, and (iv) the smart FDR system 130 audio/video interface 266. This advantageous feature is enabled by the two-way ground-to-air communication module 260, where the communication function includes parsing of the communication transmissions using one or more of: simple object access protocol communication, short message service gateway communication, and short message peer-to-peer protocol.

Figure 29:
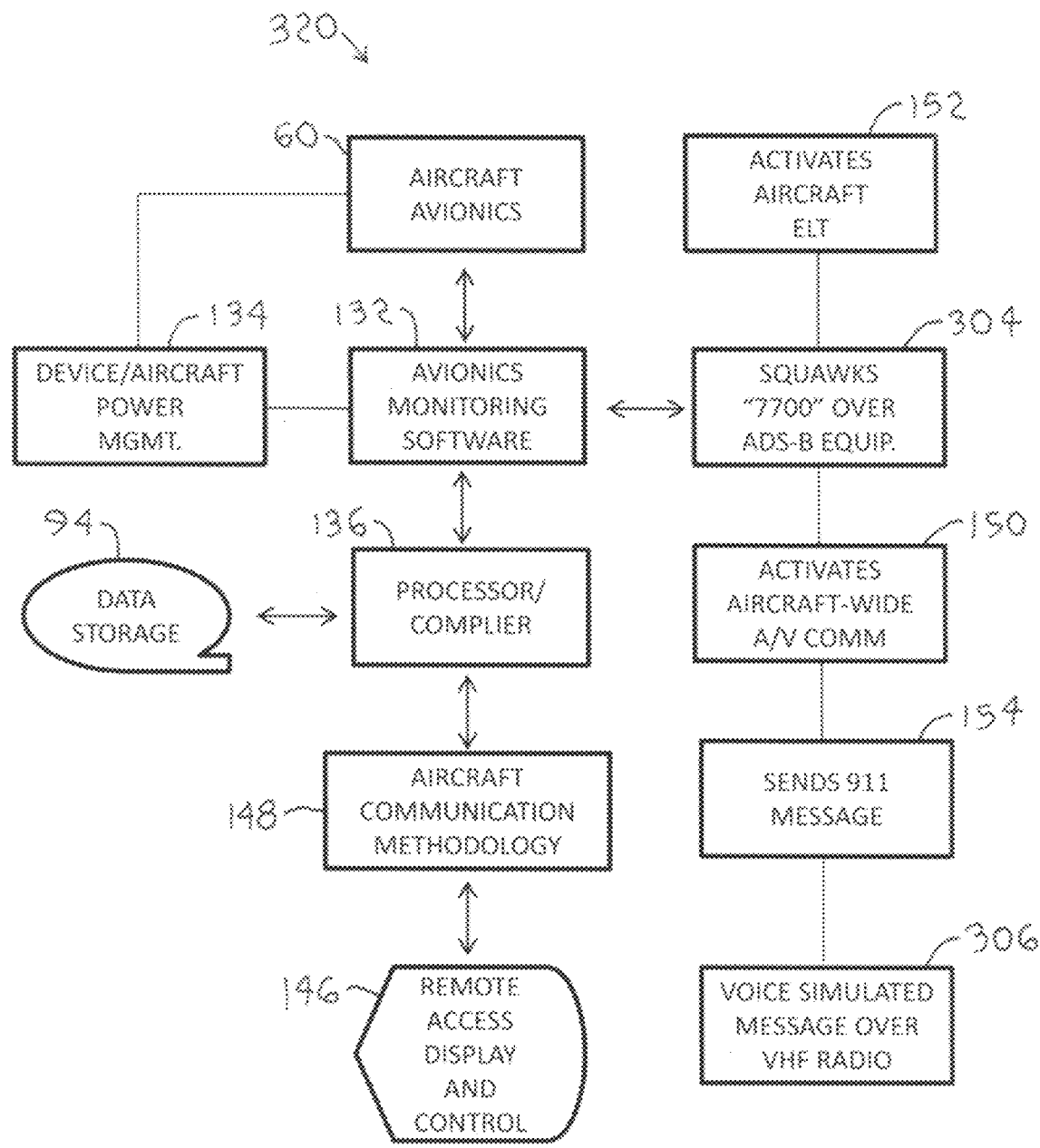
FIG. 29 illustrates a ground-based view of the cockpit instrument display of FIG. 22, in accordance with an aspect of the present invention.

FIG. 29 is a functional block diagram of a smart avionics system 320 comprising features and capabilities of the smart FDR system of FIG. 7, the smart ELT system of FIG. 11, and the smart ADS-B system of FIG. 27.

The smart avionics system 320 continually executes avionics monitoring software 132 to acquire real-time aircraft status and flight parameters. This data is recorded and reported to ground-based facilities for immediate viewing, and/or for archiving, in accordance with pre-established criteria and procedures. The avionics monitoring software 132 acquires aircraft operating parameters by monitoring the aircraft avionics 60, and by monitoring the power status of the aircraft 84 systems via the device/aircraft power management module 134. The processor/compiler 136 receives essential data and parameters using the appropriate aircraft communication methodology 148 via a remote access display and control module 146.

The avionics monitoring software 132 is configured to communicate with the ADS-B squawks module 304, and a search-and-rescue module aircraft activation module 306. When a power anomaly or an out-of specification flight parameter is detected by the device/aircraft power management module 134 or by the aircraft ADS-B system 302, for example, the avionics monitoring software 132 may instruct the ADS-B squawks module 304 to issue a "7700" squawks over the aircraft ADS-B system 320.

The self-powered processor/compiler 136 receives essential data and parameters via the 134 using the appropriate aircraft communication methodology 148 via the two-way ground-to-air communication module 260. This function of the smart ADS-B system 300 provides for a real-time FDR 32 "air-to-ground" access, as enabled by an air to ground messenger module 262. The self-powered processor/compiler 136 receives essential data and parameters via the communication portal 162 using the appropriate aircraft communication methodology 148 via the two-way ground-to-air communication module 260.

It is to be understood that the description herein is only exemplary of the invention, and is intended to provide an overview for the understanding of the nature and character of the disclosed aircraft emergency communication systems. The accompanying drawings are included to provide a further understanding of various features and embodiments of the method and devices of the invention which, together with their description serve to explain the principles and operation of the invention.

What is claimed is:

1. An aircraft emergency communication network suitable for providing two-way communication between an aircraft in flight and ground-based facilities, said aircraft communication network comprising:

avionics monitoring software in communication with aircraft avionics, said aircraft avionics including a flight data recorder and an aircraft emergency location transmitter; said avionics monitoring software functioning to acquire real-time aircraft avionics operating parameters by additionally monitoring an automatic dependent surveillance broadcast (ADS-B) system and a device/aircraft power management module; said avionics monitoring software further functioning to communicate with an activation module to activate at least one of (i) said aircraft emergency location transmitter and (ii) a satellite tracking system upon detection of an anomaly in said aircraft avionics operating parameters, at least one of said aircraft emergency location transmitter and said satellite tracking system functioning to transmit aircraft location coordinates and an emergency signal;

at least one of said aircraft emergency location transmitter and said satellite tracking system further in communication with said avionics monitoring software such that said at least one of said emergency location transmitter and said satellite tracking system can be remotely activated and remotely reset by air traffic authorities through a ground-based web interface in communication with the ground-based facilities;

a self-powered processor/compiler in communication with said avionics monitoring software; and a transmitter in communication with said processor/compiler, said processor/compiler functioning to provide real-time data processed from said real-time aircraft avionics operating parameters to said transmitter for transmission to the ground-based facilities using two-way ground-to-air communication methodology so as to enable immediate viewing and reporting by the ground-based facilities.

2. An aircraft emergency communication network as in claim 1, wherein said two-way ground-to-air communication methodology functions to provide two-way communication among an aircraft in flight; the ground-based facilities, and at least one search and rescue satellite system.

3. An aircraft emergency communication network as in claim 1 wherein said two-way ground-to-air communication methodology functions to provide communication access by the ground-based facilities to said flight data recorder.

4. An aircraft emergency communication network suitable for providing two-way communication among aircraft, ground-based facilities, and search and rescue satellite systems, said network comprising:
avionics monitoring hardware and software in communication with aircraft avionics, said aircraft avionics including an aircraft emergency location transmitter, a satellite tracking system, and a device/aircraft power management module; said avionics monitoring hardware and software functioning to acquire real-time aircraft operating parameters by monitoring said device/aircraft power management module; said avionics monitoring hardware and software further functioning to communicate with an activation module to activate at least one of (i) said aircraft emergency location transmitter and (ii) two-way communication with the search and rescue satellite systems upon detection of an anomaly in said real-time aircraft operating parameters, said aircraft emergency location transmitter functioning to transmit aircraft location coordinates and an emergency signal,
at least one of said aircraft emergency location transmitter and said satellite tracking system further in communication with said avionics monitoring hardware and software such that said at least one of said emergency location transmitter and said satellite tracking system can be remotely activated and remotely reset by air traffic authorities through a ground-based web interface in communication with the search and rescue satellite systems;
a self-powered processor/compiler in communication with said avionics monitoring hardware and software; and
a transmitter in communication with said processor/compiler, said processor/compiler functioning to transmit said real-time aircraft operating parameters to said at least one of said emergency location transmitter and said satellite tracking system for transmission to at least one of the ground-based facilities and the search and rescue satellite systems.

5. An aircraft emergency communication network as in claim 4, wherein said at least one of said aircraft emergency location transmitter and said satellite tracking system is activated by at least one avionics device, aircraft instrument, or avionics system in communication with said avionics monitoring hardware and software.

6. An aircraft emergency communication network as in claim 4, wherein said at least one of said aircraft emergency location transmitter and said satellite tracking system is activated when a programmable digital gyroscope's yaw, pitch or roll operating parameters are breached.

7. An aircraft emergency communication network as in claim 4, wherein said at least one of said aircraft emergency location transmitter and said satellite tracking system is activated when a programmable accelerometer operating parameters are breached.

8. An aircraft emergency communication network as in claim 4, wherein said at least one of said aircraft emergency location transmitter and said satellite tracking system is activated by a secondary aircraft tracking system in communication with a global positioning system.

9. An aircraft emergency communication network as in claim 4, wherein said at least one of said aircraft emergency location transmitter and said satellite tracking system is activated upon detection of at least one of a power interruption to, a device tampering of, or failure of an aircraft avionics component during flight.

10. An aircraft emergency communication network as in claim 9, wherein said aircraft avionics component comprises one of a transponder, an automatic dependent surveillance broadcast system, or an aircraft communication addressing and reporting system.

11. An aircraft emergency communication network as in claim 4, wherein said at least one of said aircraft emergency location transmitter and said satellite tracking system is activated upon a critical warning indication from at least one of a terrain awareness warning system or an engine indicating crew alerting system.

12. An aircraft emergency communication network as in claim 4, wherein said at least one of said aircraft emergency location transmitter and said satellite tracking system is activated upon receiving a warning from a smoke detector.

13. An aircraft emergency communication network as in claim 4, wherein said at least one of said aircraft emergency location transmitter and said satellite tracking system is activated upon detection of a malfunction of either of an automatic dependent surveillance broadcast or an automatic dependent surveillance communication.

14. An aircraft emergency communication network as in claim 4, wherein said at least one of said aircraft emergency location transmitter and said satellite tracking system is activated upon aircraft deviation from an original flight plan.

15. An aircraft emergency communication network in claim 4, wherein said avionics monitoring hardware and software is in two-way communication with said ground-based aviation facilities and search and rescue personnel such that messages sent by said avionics monitoring hardware and software through available communication methodologies include at least one of a GPS location of the aircraft, a geo-location of the aircraft, and an identification of the aircraft.

16. An aircraft communication system suitable for providing two-way communication between an aircraft in flight and ground-based facilities, said aircraft communication system comprising:
avionics monitoring software in communication with aircraft avionics, said aircraft avionics including a flight data recorder, an automatic dependent surveillance broadcast (ADS-B) system, a device/aircraft power management module, and at least one of an aircraft emergency location transmitter and a satellite tracking system; said avionics monitoring software functioning to acquire real-time aircraft operating parameters by monitoring said ADS-B system and said device/aircraft power management module; said avionics monitoring software further functioning to communicate with an activation module for initiating activation of at least one of (i) said aircraft emergency location transmitter, (ii) said satellite tracking system, and (iii) two-way communication with a satellite upon detection of an anomaly in said aircraft operating parameters, said aircraft emergency location transmitter functioning to transmit aircraft location coordinates and an emergency signal;

at least one of said aircraft emergency location transmitter and said satellite tracking system further in communication with said avionics monitoring software such that said at least one of said emergency location transmitter and said satellite tracking system can be remotely activated and remotely reset by air traffic authorities through a ground-based web interface in communication with the ground-based facilities;

a self-powered processor/compiler in communication with said avionics monitoring software;

a transmitter in communication with said processor/compiler, said processor/compiler functioning to transmit real-time data processed from said aircraft avionics operating parameters to said transmitter for transmission and reporting to the ground-based facilities for immediate viewing using said ground-based web interface; and a waterproof crash-survivable enclosure with floating capability, said enclosure containing said flight data recorder, said emergency location transmitter, and said transmitter.

17. The aircraft communication system as in claim 16 wherein said enclosure comprises an embedded antenna for remote activation over a satellite network by said air traffic authorities after an aircraft crash on land or in water.

\* \* \* \* \*